United States Patent
Cho

(10) Patent No.: US 11,963,122 B2
(45) Date of Patent: Apr. 16, 2024

(54) METHOD FOR ESTIMATING RECEPTION DELAY TIME OF REFERENCE SIGNAL AND APPARATUS USING THE SAME

(71) Applicant: LOCAILA, INC, San Jose, CA (US)

(72) Inventor: Jaihyung Cho, Daejeon (KR)

(73) Assignee: Locaila, Inc, San Jose, CA (US)

( * ) Notice: Subject to any disclaimer, the term of this patent is extended or adjusted under 35 U.S.C. 154(b) by 26 days.

(21) Appl. No.: 17/830,357

(22) Filed: Jun. 2, 2022

(65) Prior Publication Data

US 2022/0303928 A1  Sep. 22, 2022

Related U.S. Application Data

(63) Continuation of application No. PCT/KR2020/017334, filed on Nov. 30, 2020.

(60) Provisional application No. 62/944,057, filed on Dec. 5, 2019.

(51) Int. Cl.
*H04W 56/00* (2009.01)
*H04L 5/00* (2006.01)

(52) U.S. Cl.
CPC ......... *H04W 56/003* (2013.01); *H04L 5/0051* (2013.01); *H04W 56/001* (2013.01)

(58) Field of Classification Search
CPC .. H04W 56/003; H04W 56/001; H04L 5/0051
See application file for complete search history.

(56) References Cited

U.S. PATENT DOCUMENTS

| | | | |
|---|---|---|---|
| 10,218,386 B1* | 2/2019 | Langhammer | H03M 13/1515 |
| 2005/0169408 A1* | 8/2005 | Kim | H04L 27/2659 |
| | | | 375/343 |
| 2006/0030366 A1 | 2/2006 | Park et al. | |
| 2008/0130914 A1* | 6/2008 | Cho | G10L 21/0208 |
| | | | 381/94.1 |
| 2009/0310724 A1* | 12/2009 | Shah | H04B 1/1027 |
| | | | 375/346 |
| 2011/0074633 A1 | 3/2011 | Pun et al. | |
| 2018/0070364 A1* | 3/2018 | Varanese | H04B 1/1027 |
| 2018/0287775 A1 | 10/2018 | Chen et al. | |
| 2020/0052852 A1* | 2/2020 | Vitthaladevuni | H04B 7/0619 |

FOREIGN PATENT DOCUMENTS

KR   1020160021070 A   2/2016

OTHER PUBLICATIONS

Ariel Jaffe et al., Single-Site Localization via Maximum Discrimination Multipath Fingerprinting, Feb. 6, 2014.

(Continued)

*Primary Examiner* — Chae S Lee

(57) ABSTRACT

Disclosed is a method of estimating, by a user equipment, a reception delay time of a reference signal, the method including receiving a reference signal from a base station; setting a plurality of summation time intervals within a time interval in which the reference signal is received, and acquiring a plurality of snapshot vectors corresponding to the plurality of summation time intervals; calculating a covariance matrix based on the plurality of snapshot vectors; and estimating a reception delay time of the reference signal based on the covariance matrix.

18 Claims, 17 Drawing Sheets

(56) References Cited

OTHER PUBLICATIONS

WIPO, ISA210, International Search Report of Internal Application No. PCT/.KR2020/017334, dated Mar. 24, 2021, 4 pages.
WIPO, ISA237, International Written Opinion of Internal Application No. PCT/.KR2020/017334, dated Mar. 24, 2021, 3 pages.

* cited by examiner

METHOD FOR ESTIMATING RECEPTION DELAY TIME OF REFERENCE SIGNAL AND APPARATUS USING THE SAME

CROSS-REFERENCE TO RELATED APPLICATION

This application is a US Bypass Continuation Application of International Application No. PCT/KR2020/017334, filed on Nov. 30, 2020, and designating the United States, the International Application claiming a priority date of Dec. 5, 2019, based on prior U.S. Application No. 62/944,057, filed on Dec. 5, 2019, the disclosure of which is incorporated herein by reference in its entirety.

BACKGROUND

Technical Field

The present disclosure of the following description relates to a method and apparatus for calculating a reception delay time of a reference signal and, more particularly, to a method of estimating a position of a user equipment (UE) or determining a timing offset of a base station based on a reception delay time of a reference signal.

Related Art

A communication system may include a core network, for example, a mobility management entity (MME), a serving gateway (SGW), a packet data network (PDN) gateway (PGW), a base station (e.g., a macro base station, a small base station, and a relay), a user equipment (UE), and the like. Communication between the base station and the UE may be performed using a variety of radio access technology (RAT), for example, 4-th generation (4G) communication technology, 5-th generation (5G) communication technology, wireless broadband (WiBro) technology, wireless local area network (WLAN) technology, and wireless personal area network (WPAN) technology.

In a communication system, a UE may generally transmit and receive data through a base station. For example, if data to be transmitted to a second UE is present, a first UE may generate a message including the data to be transmitted to the second UE and may transmit the generated message to a first base station to which the first UE belongs. The first base station may receive the message from the first UE and may verify that a destination of the received message is the second UE. The first base station may transmit the message to a second base station to which the verified destination, that is, the second UE belongs. The second base station may receive the message from the first base station and may verify that the destination of the received message is the second UE. The second base station may transmit the message to the verified destination, that is, the second UE. The second UE may receive the message from the second base station and may acquire the data included in the received message.

A reference signal may be transmitted and received between a UE and a base station. As another example, a reference signal may be transmitted and received between two different base stations. The reference signal may be used for various purposes. For example, the UE or the base station may perform synchronization or may estimate a position of the UE using the reference signal. As one of positioning methods using RAT, the UE may estimate a position of the UE by measuring a difference in time of arrival (ToA) between positioning reference signals (PRSs) received from a plurality of base stations.

The UE or the base station may calculate a reception delay time of the reference signal. Here, the reception delay time of the reference signal may represent a time difference between a point in time at which the reference signal is transmitted from a transmitter and a point in time at which the reference signal is received at a receiver. If an obstacle is present between the transmitter and the receiver, it may not be easy to calculate the reception delay time of the reference signal.

If the obstacle is present between the transmitter and the receiver, the reference signal may arrive at the receiver through a multipath. Accordingly, a delay spread of a signal occurs, which makes it difficult to estimate a reception delay time for a linear path between the transmitter and the receiver.

SUMMARY

At least one example embodiment provides a method that may estimate a reception delay time of a reference signal in a multipath environment.

At least one example embodiment provides a method that may estimate a position of a user equipment (UE) based on an estimated delay time of a reference signal.

At least one example embodiment provides a method that may estimate a timing offset of a base station based on an estimated delay time of a reference signal.

According to an aspect, there is provided a method of estimating, by a UE, a reception delay time of a reference signal, the method including receiving a reference signal from a base station; setting a plurality of summation time intervals within a time interval in which the reference signal is received, and acquiring a plurality of snapshot vectors corresponding to the plurality of summation time intervals; calculating a covariance matrix based on the plurality of snapshot vectors; and estimating a reception delay time of the reference signal based on the covariance matrix.

The reference signal may include a plurality of subcarrier signals, and a waveform of each of the plurality of subcarrier signals may be continuous in a plurality of symbol periods.

The plurality of summation time intervals may be set by shifting a start point of a summation time interval within the time interval in which the reference signal is received by an integer multiple of a sample time that is determined based on a sampling rate.

An n-th snapshot vector corresponding to an n-th summation time interval may be calculated and an (n+1)-th snapshot vector corresponding to an (n+1)-th summation time interval may be calculated, and a portion of a calculation result of the n-th snapshot vector may be applied to a part corresponding to a time interval in which the n-th summation time interval and the (n+1)-th summation time interval overlap during a process of calculating the (n+1)-th snapshot vector.

The reference signal may include a plurality of subcarrier signals, and the plurality of subcarrier signals may be provided at identical intervals in a frequency domain.

The snapshot vector may be represented as a multiplication of a plurality of matrices, and a condition that at least one of the plurality of matrices is a Vandermonde matrix may be satisfied.

The UE may calculate an eigenvector of the covariance matrix and may estimate the reception delay time of the reference signal based on the eigenvector of the covariance matrix.

According to at least one example embodiment, since a waveform of each of subcarrier signals of a reference signal is continuous in a boundary between symbols, a receiver may readily acquire a relatively large number of snapshot vectors.

According to at least one example embodiment, since a Vandermonde matrix is used during a process of calculating a snapshot vector and a covariance matrix, a calculation process may be simplified.

According to at least one example embodiment, a calculation amount used for a receiver to calculate a plurality of snapshot vectors may decrease.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

DETAILED DESCRIPTION

Figure 1:
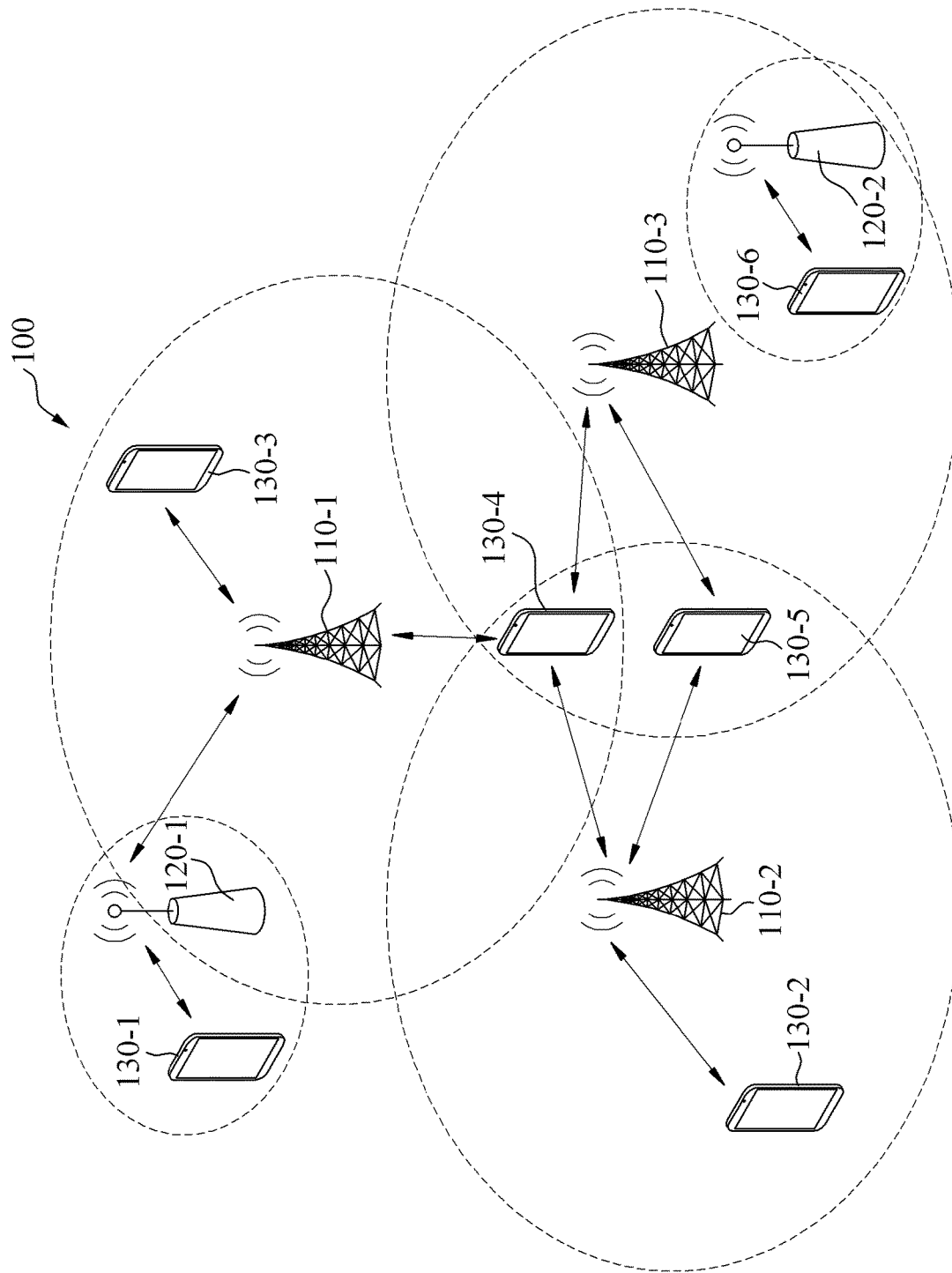
FIG. 1 illustrates an example of a communication system according to at least one example embodiment.

Various modifications and changes may be made to the present disclosure and the disclosure may include various example embodiments. Specific example embodiments are described in detail with reference to the accompanying drawings. The example embodiments, however, may be embodied in various different forms, and should not be construed as being limited to only the specific example embodiments. Rather, the example embodiments should be understood to include all of the modifications, equivalents, and substitutions included in the spirit and technical scope of the disclosure.

Although the terms "first", "second", etc., may be used herein to describe various components, the components should not be limited by these terms. These terms are only used to distinguish one component from another component. For example, a first component may also be termed a second component and, likewise, a second component may be termed a first component, without departing from the scope of this disclosure. As used herein, the term "and/or" includes any and all combinations of one or more of the associated items.

When a component is referred to as being "connected to" or "coupled to" another component, the component may be directly connected to or coupled to the other component, or one or more other intervening components may be present. In contrast, when a component is referred to as being "directly connected to" or "directly coupled to", there is no intervening component.

The terms used herein are used to simply explain specific example embodiments and are not construed to limit the present disclosure. The singular forms "a", "an", and "the", are intended to include the plural forms as well, unless the context clearly indicates otherwise. It will be further understood that the terms "comprises/comprising," and "has/having" when used in this specification, specify the presence of stated features, integers, steps, operations, elements, and/or components, but do not preclude the presence or addition of one or more other features, integers, steps, operations, elements, components, and/or groups, thereof.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Hereinafter, example embodiments will be described in detail with reference to the accompanying drawings. For simplicity of description and general understanding of the disclosure, like reference numerals refer to like components throughout the present specification although they are illustrated in different drawings.

Herein, a reference signal may include, for example, a signal for positioning of a user equipment (UE), a signal for synchronization of the UE or a base station, and the like. A method of estimating a reception delay time of a reference signal disclosed herein may apply to estimating a reception delay time of another signal aside from the reference signal. Here, although an example embodiment is described based on an example of estimating the reception delay time of the reference signal for clarity of description, it is provided as an example only. It should be understood that a method of estimating the reception delay time of the other signal aside from the reference signal is included in the example embodiment.

FIG. 1 illustrates an example of a communication system according to at least one example embodiment.

Referring to FIG. 1, a communication system 100 may include a plurality of communication nodes, for example, a plurality of base stations 110-1, 110-2, 110-3, 120-1, and 120-2, and a plurality of UEs 130-1, 130-2, 130-3, 130-4, 130-5, and 130-6. Here, the communication system 100 may be referred to as a "communication network". Each of the plurality of communication nodes may support at least one communication protocol. For example, each of the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier (SC)-FDMA based communication protocol, a non-orthogonal multiple access (NOMA) based communication protocol, a space division multiple access (SDMA) based communication protocol, and the like. Each of the plurality of communication nodes may have the following structure.

The communication system 100 may include the plurality of base stations 110-1, 110-2, 110-3, 120-1, and 120-2, and the plurality of UEs 130-1, 130-2, 130-3, 130-4, 130-5, and 130-6. Each of the first base station 110-1, the second base station 110-2, and the third base station 110-3 may form a macro cell. Each of the fourth base station 120-1 and the fifth base station 120-2 may form a small cell. The fourth base station 120-1, the third UE 130-3, and the fourth UE 130-4 may be included in coverage of the first base station 110-1. The second UE 130-2, the fourth UE 130-4, and the fifth UE 130-5 may be included in coverage of the second base station 110-2. The fifth base station 120-2, the fourth UE 130-4, the fifth UE 130-5, and the sixth UE 130-6 may be included in coverage of the third base station 110-3. The first UE 130-1 may be included in coverage of the fourth base station 120-1. The sixth UE 130-6 may be included in coverage of the fifth base station 120-2.

Here, each of the plurality of base stations 110-1, 110-2, 110-3, 120-1, and 120-2 may be referred to as, for example, NodeB, evolved NodeB, a base transceiver station (BTS), a radio base station, a radio transceiver, an access point, an access node, a road side unit (RSU), a radio remote head (RRH), a transmission point (TP), a transmission and reception point (TRP), a relay node, etc. Each of the plurality of UEs 130-1, 130-2, 130-3, 130-4, 130-5, and 130-6 may be referred to as a terminal, an access terminal, a mobile terminal, a station, a subscriber station, a mobile station, a portable subscriber station, a node, a device, etc.

Each of the plurality of communication nodes 110-1, 110-2, 110-3, 120-1, 120-2, 130-1, 130-2, 130-3, 130-4, 130-5, and 130-6 may support a cellular communication (e.g., long term evolution (LTE), LTE-advanced (LTE-A), 5-th (5G) new radio (NR), etc., specified in a 3rd generation partnership project (3GPP) standard). Each of the plurality of base stations 110-1, 110-2, 110-3, 120-1, and 120-2 may operate in a different frequency band or may operate in the same frequency band. The plurality of base stations 110-1, 110-2, 110-3, 120-1, and 120-2 may be connected to each other through an ideal backhaul or a non-ideal backhaul and may exchange information with each other through the ideal backhaul or the non-ideal backhaul. Each of the plurality of base stations 110-1, 110-2, 110-3, 120-1, and 120-2 may be connected to a core network (not shown) through the ideal backhaul or the non-ideal backhaul. Each of the plurality of base stations 110-1, 110-2, 110-3, 120-1, and 120-2 may transmit a signal received from the core network to a corresponding UE among the UEs 130-1, 130-2, 130-3, 130-4, 130-5, and 130-6, and may transmit a signal received from the corresponding UE among the UEs 130-1, 130-2, 130-3, 130-4, 130-5, and 130-6 to the core network.

Each of the plurality of base stations 110-1, 110-2, 110-3, 120-1, and 120-2 may support an OFDMA based downlink (DL) transmission and may also support an SC-FDMA based uplink (UL) transmission. Further, each of the plurality of base stations 110-1, 110-2, 110-3, 120-1, and 120-2 may support, for example, a multiple input multiple output (MIMO) transmission (e.g., single user (SU)-MIMO, multi user (MU)-MIMO, massive MIMO, etc.), a coordinated multipoint (CoMP) transmission, a carrier aggregation (CA) transmission, a transmission in an unlicensed band, device to device (D2D) communication or proximity services (ProSe), etc. Here, each of the plurality of UEs 130-1, 130-2, 130-3, 130-4, 130-5, and 130-6 may perform an operation corresponding to a corresponding base station among the base stations 110-1, 110-2, 110-3, 120-1, and 120-2 or may perform an operation supported by the corresponding base station among the base stations 110-1, 110-2, 110-3, 120-1, and 120-2.

Figure 2:
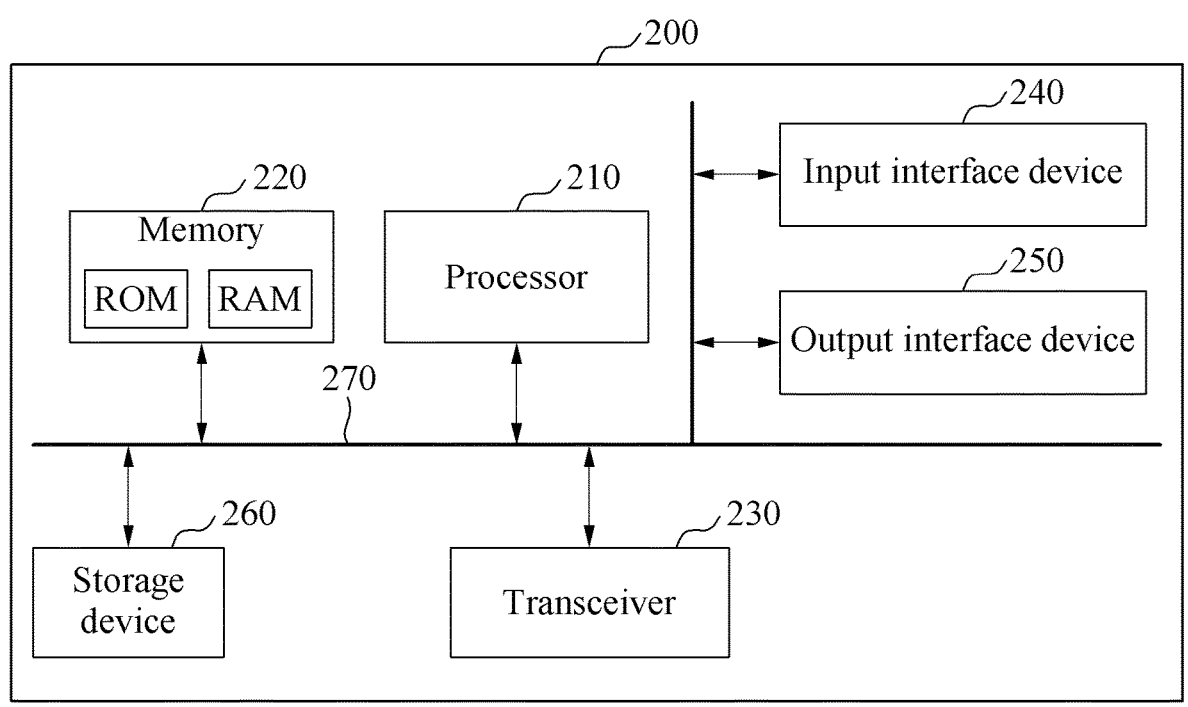
FIG. 2 is a diagram illustrating an example of a configuration of a communication node included in a communication system according to at least one example embodiment.

FIG. 2 is a diagram illustrating an example of a configuration of a communication node included in a communication system according to at least one example embodiment.

Referring to FIG. 2, a communication node 200 may include at least one processor 210, a memory 220, and a transceiver 230 configured to perform communication through connection to a network. Also, the communication node 200 may further include an input interface device 240, an output interface device 250, and a storage device 260. The respective components included in the communication node 200 may connect to a bus 270 and may communicate with each other through the bus 270.

The processor 210 may execute a program command stored in at least one of the memory 220 and the storage device 260. The processor 210 may refer to a central processing unit (CPU), a graphics processing unit (GPU), or an exclusive processor configured to perform methods according to example embodiments. Each of the memory 220 and the storage device 260 may be configured as at least one of volatile storage media and non-volatile storage media. For example, the memory 220 may be configured as at least one of read only memory (ROM) and random access memory (RAM).

Figure 3:
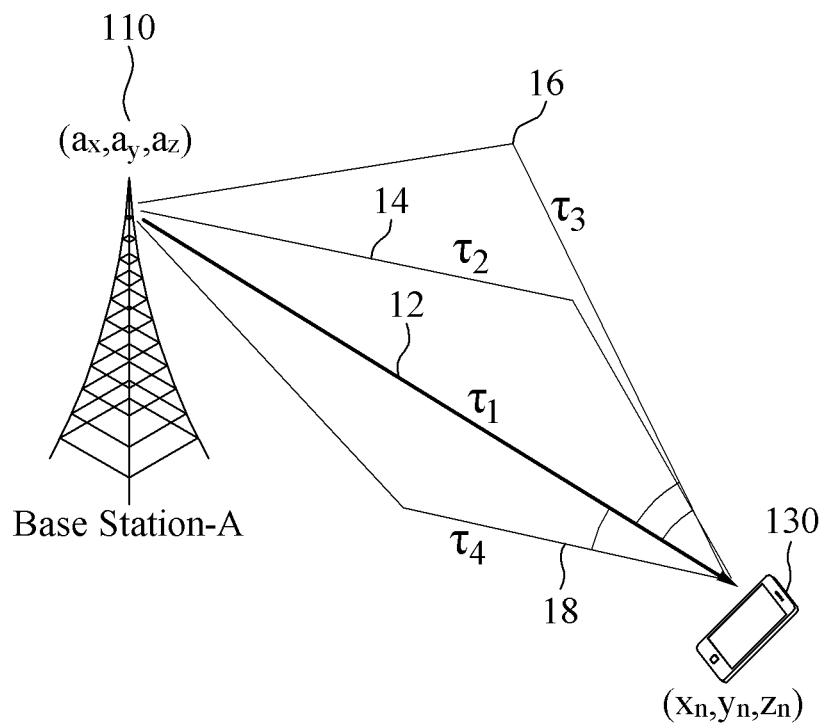
FIG. 3 illustrates an example of a multipath environment according to at least one example embodiment.

FIG. 3 illustrates an example of a multipath environment according to at least one example embodiment.

Although FIG. 3 illustrates an example in which a base station 110 transmits a reference signal and a UE 130 receives the reference signal, it is provided as an example only. For example, the UE 130 may transmit a reference signal and the base station 110 may receive the reference signal. As another example, the base station 110 may transmit a reference signal to another base station. Referring to FIG. 3, a signal neither refracted nor reflected by an obstacle may be transmitted through a first path 12 corresponding to a shortest path. In contrast, a signal refracted or reflected by an obstacle may be transmitted through one of a second path 14, a third path 16, and a fourth path 18. A reception delay time $\tau_1$ of a signal transmitted through the first path 12 may be less than reception delay times $\tau_2$, $\tau_3$, and $\tau_4$ of signals transmitted through the second path 14, the third path 16, and the fourth path 18. A delay spread may occur due to a signal having a delay time, for example, the reception delay time $\tau_2$, $\tau_3$, $\tau_4$ greater than the reception delay time ii corresponding to the first path 12. The delay spread may make it difficult for the UE 130 to estimate the delay time, for example, the reception delay time $\tau_1$ corresponding to the shortest path.

Hereinafter, a method of transmitting a reference signal and a method of estimating a reception delay time of a reference signal according to example embodiments are described. In the following, description is made based on an example in which the base station 110 performs the functionality of a transmitter and the UE 130 performs the functionality of a receiver. However, it is provided as an example only. For example, the UE 130 may perform the functionality of a transmitter and the base station 110 may perform the functionality of a receiver. The following example embodiments may apply to communication between UEs or communication between base stations.

A waveform of each of subcarrier signals included in a reference signal may be is continuous such that the UE 130 may easily acquire a plurality of snapshot vectors. In contrast, in a general communication system to which an OFDM transmission method applies, a reference signal may be discontinuous in a boundary between symbols.

In the case of LTE, a sampling rate may be 30.72 MHz and a reciprocal number thereof, 32.552 nanoseconds, may be used as 1 $T_s$ that is a basic time unit. In the case of general positioning, if a single basic time unit is multiplied by a speed of light and is converted to a distance, about an error of 10 m may occur. Therefore, it may be difficult to further decrease an error.

Figure 4:
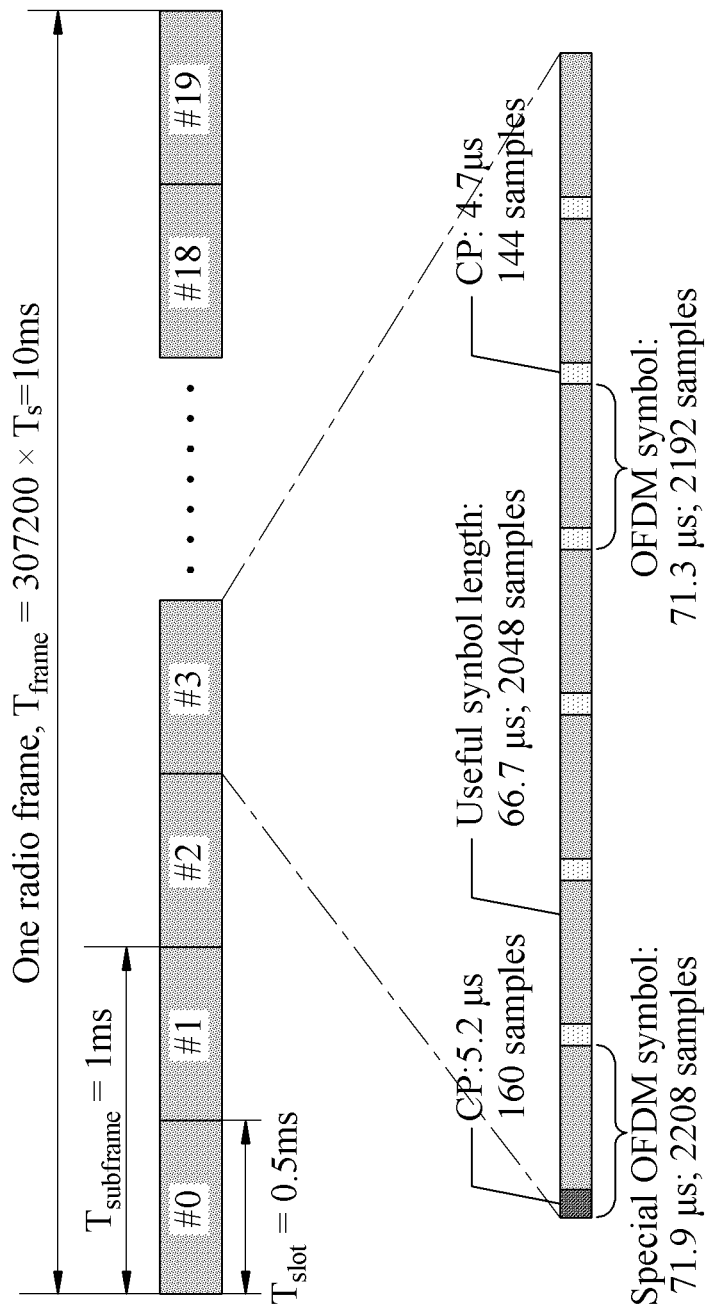
FIG. 4 illustrates an example of a frame structure of long term evolution (LTE) according to at least one example embodiment.

FIG. 4 illustrates an example of a frame structure of LTE according to at least one example embodiment.

Referring to FIG. 4, a radio frame may include 10 subframes and each of the subframes may include 2 slots. Accordingly, the radio frame may include 20 slots, for example, slot #0, slot #1, slot #2, slot #3, . . . , slot #18, and slot #19. The radio frame may have a length $T_{frame}$ of 10 ms. A subframe length $T_{subframe}$ may be 1 ms and a slot length $T_{slot}$ may be 0.5 ms.

A slot may include a plurality of OFDM symbols in a time domain and may include a plurality of resource blocks (RBs) in a frequency domain.

A resource block may include a plurality of subcarriers in the frequency domain. A number of OFDM symbols constituting a slot may vary based on a configuration of a cyclic prefix (CP). The CP may be classified into a normal CP and an extended CP. If the normal CP is used, a slot may include 7 OFDM symbols. In this case, a subframe may include 14 OFDM symbols. If the extended CP is used, a slot may include 6 OFDM symbols. In this case, a subframe may include 12 OFDM symbols. In FIG. 4, the normal CP is applied.

If the normal CP is used in an LTE standard, a slot may include 7 OFDM symbols. If the extended CP is used in the LTE standard, a slot may include 6 OFDM symbols. However, it is provided as an example only and the example embodiments are not limited thereto. For example, if the normal CP is used in a 5G NR standard, a slot may be defined to include 14 OFDM symbols. Also, if the extended CP is used in the LTE standard, a slot may include 6 OFDM symbols. However, it is provided as an example only and the example embodiments are not limited thereto. For example, if the extended CP is used in the 5G NR standard, a slot may include 12 OFDM symbols.

A length of a valid period of a symbol may be determined based on a subcarrier spacing. The length of the valid period of the symbol may correspond to a reciprocal number of the subcarrier spacing. If the subcarrier spacing is 15 kHz, the length of the valid period of the symbol may be a reciprocal number of 15 kHz, i.e., about 66.67 μsec (=2048 $T_s$). A phase of a k-th subcarrier in the valid period of the symbol may be shifted by $2\pi k$.

Each symbol may include a CP that duplicates a portion of a last part of a corresponding symbol and attaches the duplicated portion in a front portion of the symbol. A length of the normal CP may be about 144 $T_s$, which may correspond to 9/128 (=144/2048) of a valid length of a single symbol. A symbol length including CP is about 71.36 μsec. Although 7 symbols are added, an exact length of 0.5 ms is not achieved. Therefore, 5.21 μsec (=160 $T_s$) may be acquired by further extending only a first symbol of each slot. A CP of a first symbol of a slot may correspond to 10/128 (=160/2048) of the valid length of the symbol. If the normal CP is used, a total sum of accumulated times used for a CP (also, referred to as accumulated CP duration) in 0.5 ms in which a single slot is continuous may be about 1,024 $T_s$ (=160 $T_s$+144*6 $T_s$), which may correspond to a half of the valid period (=2,048 $T_s$) of a single symbol.

A length of the extended CP is about 512 $T_s$, which may correspond to 1/4 (=512/2048) of the valid length of a single symbol. If the extended CP is used, accumulated CP duration in 0.5 ms in which a single slot is continuous may be about 3,072 $T_s$ (=512*6 $T_s$), which may correspond to 1.5 of the valid period (=2,048 $T_s$) of a single symbol.

An index of a symbol may be numbered for each slot. Therefore, if the normal CP is used, an index of a symbol may use one of 0 to 6. If the extended CP is used, an index of a symbol may use one of 0 to 5. Here, it is assumed that a subcarrier spacing is 15 kHz. In the LTE standard, a length of the normal CP may be represented as the basic time unit $T_s$ according to Equation 1.

$$N_{CP,\ell} = 160 T_s \text{ for } \ell = 0$$
$$N_{CP,\ell} = 144 T_s \text{ for } \ell = 1, 2, \ldots 6 \quad \text{[Equation 1]}$$

In Equation 1, $N_{CP,\ell}$ denotes a length of a CP of an $\ell$-th symbol.

Also, in the LTE standard, the length of the extended CP may be determined according to Equation 2.

$$N_{CP,\ell} = 512 T_s \text{ for } \ell = 0, 1, \ldots 5 \quad \text{[Equation 2]}$$

The 3GPP has published a new radio (NR) subcarrier spacing and a frame standard in a flexible form for 5G mobile communication, starting from Release 15. According to TS38.211 that is a 3GPP standard, even a 5G NR standard may include a CP in a front portion of a symbol of downlink, which is similar to a 4G LTE standard. Also, the 5G NR standard may support various subcarrier spacings, which are not supported in the LTE standard.

Figure 5:
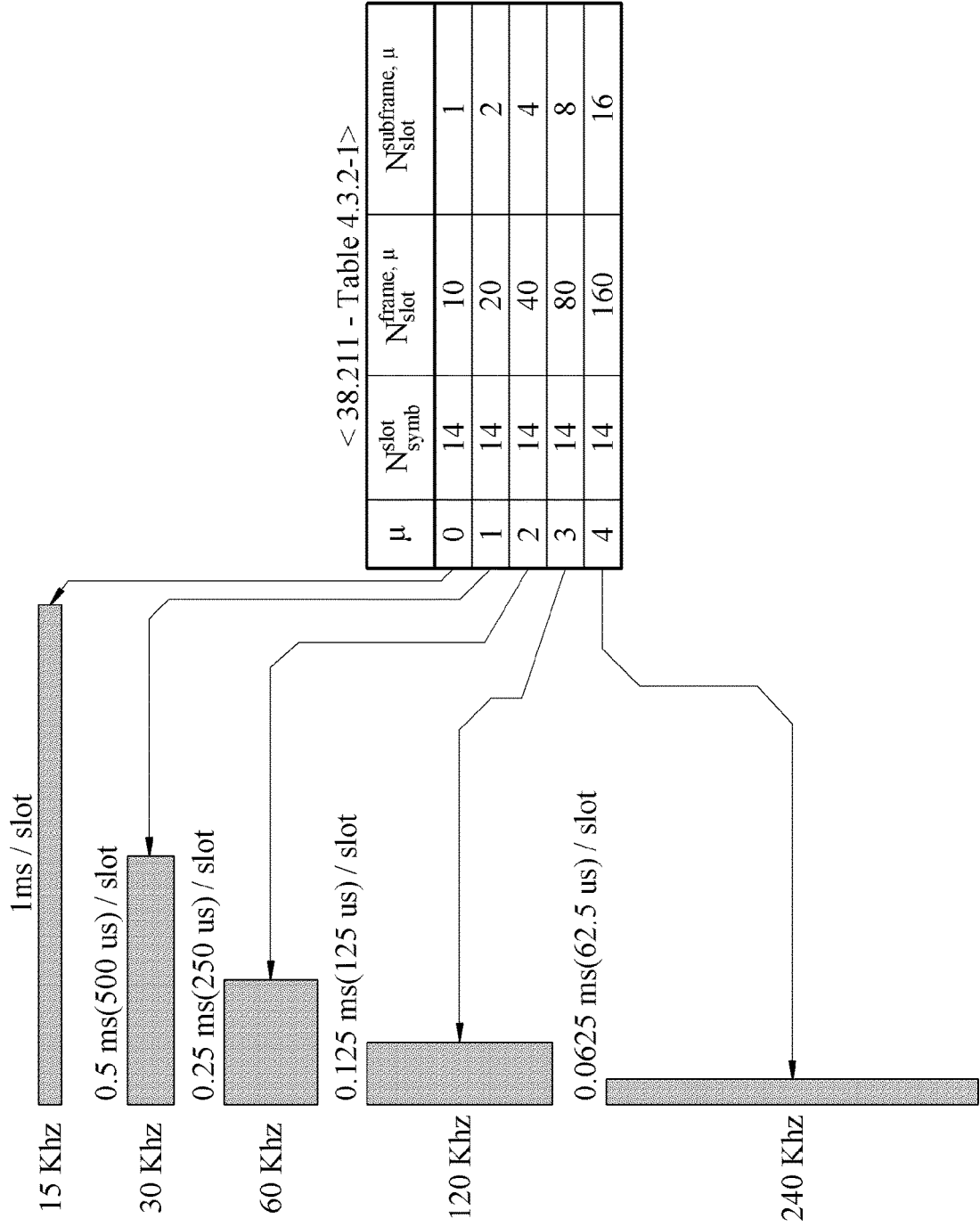
FIG. 5 illustrates an example of a subcarrier spacing supported in a 5-th generation (5G) new radio (NR) standard according to at least one example embodiment.

FIG. 5 illustrates an example of a subcarrier spacing supported in a 5G NR standard according to at least one example embodiment.

Referring to FIG. 5, in the 5G NR standard, a subcarrier spacing may be defined as Δf=15 kHz×$2^\mu$. Here, μ=0, 1, 2, 3, 4, 5. That is, the subcarrier spacing may be one of 15 kHz, 30 kHz, 60 kHz, 120 kHz, 240 kHz, and 480 kHz. Here, μ denotes an NR numerology number that determines the subcarrier spacing. A single slot may include 14 OFDM symbols. That is, a single slot may include a total of 14 OFDM symbols regardless of the subcarrier spacing. Here, if the subcarrier spacing is 60 kHz (μ=2), the extended CP may be used. In this case, a single slot may include 12 OFDM symbols.

Since a length of an OFDM symbol varies based on the subcarrier spacing, a length of the slot may vary accordingly. For example, if the subcarrier spacing is Δf=15 kHz×$2^\mu$, the length of the slot may be $1/2^\mu$ ms.

Figure 6:
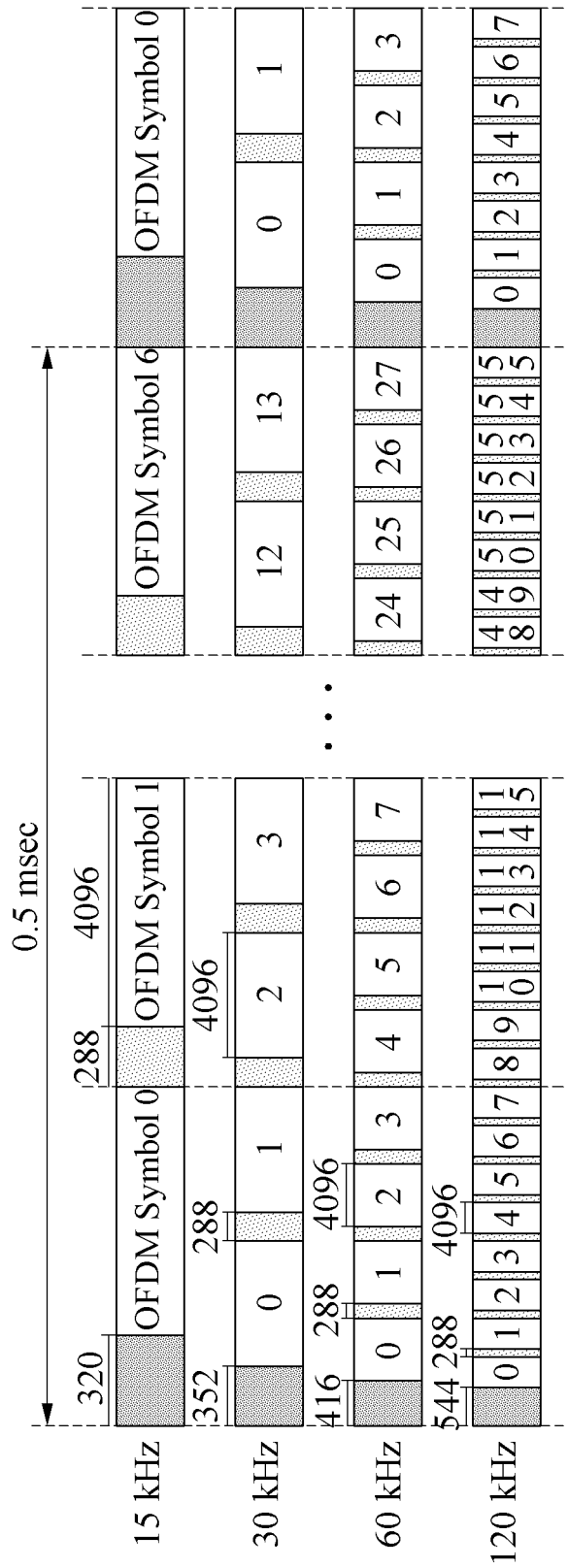
FIG. 6 illustrates an example of a structure of an orthogonal frequency division multiplexing (OFDM) symbol in a 5G NR standard according to at least one example embodiment.

FIG. 6 illustrates an example of a structure of an OFDM symbol in a 5G NR standard according to at least one example embodiment.

Referring to FIG. 6, in the 5G NR standard, (7×$2^\mu$) OFDM symbols may be included in 0.5 ms. That is, if a subcarrier spacing is 15 kHz, 7 OFDM symbols may be included in 0.5 ms, if the subcarrier spacing is 30 kHz, 14 OFDM symbols may be included in 0.5 ms, if the subcarrier spacing is 60 kHz, 28 OFDM symbols may be included in 0.5 ms, if the subcarrier spacing is 120 kHz, 56 OFDM symbols may be included in 0.5 ms, if the subcarrier spacing is 240 kHz, 112 OFDM symbols may be included in 0.5 ms, and if the subcarrier spacing is 480 kHz, 224 OFDM symbols may be included in 0.5 ms. Here, if the subcarrier spacing is 60 kHz and the extended CP is used, 24 OFDM symbols may be included in 0.5 ms.

To meet a condition that a sum of lengths of 7×$2^\mu$ OFDM symbols is 0.5 ms, a length of a CP included in a first OFDM symbol in 0.5 ms duration may be greater than a length of CP included in a remaining symbol. The length of CP included in the remaining symbol excluding the first symbol in the 0.5 ms duration may be $144T_s \times 2^{-\mu}$. Also, the length of CP of the first symbol in the 0.5 ms duration may be $144 T_s \times 2^{-\mu} + 16 T_s$.

In the 5G NR standard, a length of a valid period of a symbol may be represented as the basic time unit $T_s$ according to Equation 3.

$$N_u^\mu = 2048 T_s \cdot 2^{-\mu} \quad \text{[Equation 3]}$$

In Equation 3, denotes a parameter (i.e., NR numerology number) that determines the subcarrier spacing and $N_u^\mu$ denotes the length of the valid period of the symbol that is represented as the basic time unit.

In the 5G NR standard, the CP length may be represented as the basic time unit $T_s$ according to Equation 4.

$$N_{CP,\ell}^\mu = \begin{cases} 512\, T_s \cdot 2^{-\mu} & \text{extended cyclic prefix} \\ 144\, T_s \cdot 2^{-\mu} + 16 & \ell = 0 \text{ or } \ell = 7 \cdot 2^\mu \\ 144\, T_s \cdot 2^{-\mu} & \ell \neq 0 \text{ and } \ell \neq 7 \cdot 2^\mu \end{cases} \quad \text{[Equation 4]}$$

In Equation 4, for simplicity, it is assumed that an index of a symbol is numbered for each subframe. In this case, in a single subframe, a symbol with an index of $\ell =0$ and a symbol with an index of $\ell = 7 \cdot 2^\mu$ may correspond to the first symbols in 0.5 ms duration. In contrast, an index of a remaining symbol excluding the first symbol in the 0.5 ms duration may satisfy $\ell \neq 0$ and $\ell \neq 7 \cdot 2^\mu$. In each case, the CP length may be determined according to Equation 4.

The UE 130 may estimate a reception delay time of a reference signal by applying a super resolution analysis algorithm. If the super resolution analysis algorithm is applied, a large number of snapshot vectors may be required. The UE 130 may set a plurality of summation time intervals within a time interval in which the reference signal is received to acquire a snapshot vector. The UE 130 may extract snapshot vectors in different summation time intervals by moving, i.e., shifting a start point of a summation time interval. Here, if the reference signal is discontinuous in a boundary between symbols, a summation time interval may be limited to be present in a single symbol. Accordingly, it may be difficult for the UE 130 to acquire a sufficient number of snapshot vectors in a time interval in which the reference signal is received.

In general, an OFDM transmission method is used to describe that the reference signal is discontinuous in a boundary between symbols.

In OFDM, the respective subcarrier components may be orthogonal to each other and a signal may be represented as a sum of N complex sine waves. Therefore, a random signal may be represented as Equation 5.

$$x_\ell[n] = \sum_{k=0}^{N-1} X_\ell[k] e^{j2\pi kn/N}, \, n = 0, 1, 2, 3, \ldots N-1 \quad \text{[Equation 5]}$$

$$x_\ell[n] = \sum_{k=0}^{N-1} X_\ell[k] e^{j2\pi kn/N}, \, n = 0, 1, 2, 3, \ldots N-1$$

In Equation 5, N denotes a total number of subcarriers and $X_\ell[k]$ denotes a frequency domain complex exponentiation representing an initial phase and amplitude of a k-th subcarrier of an $\ell$-th symbol.

Figure 7:
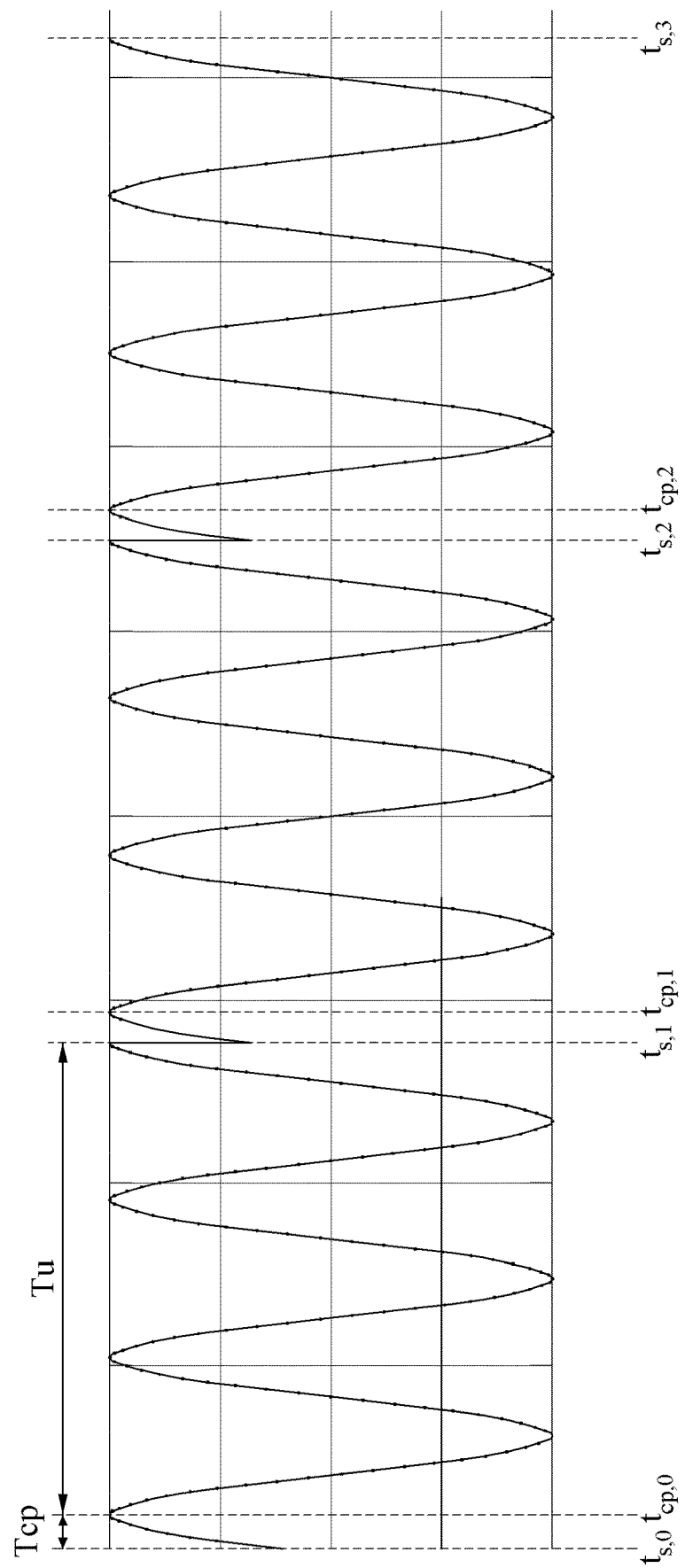
FIG. 7 illustrates an example of a subcarrier discontinuous in a boundary between OFDM symbols according to at least one example embodiment.

FIG. 7 illustrates an example of a subcarrier discontinuous in a boundary between OFDM symbols according to at least one example embodiment. As an example, FIG. 7 illustrates a subcarrier corresponding to k=3.

Referring to FIG. 7, $t_{s,0}$, $t_{s,1}$, $t_{s,2}$, and $t_{s,3}$ denote a start point of a zero-th symbol, a start point of a first symbol, a start point of a second symbol, and a start point of a third symbol, respectively. Also, $t_{cp,0}$ denotes an end point of a CP duration of the zero-th symbol and also a start point of a valid period of the zero-th symbol. Likewise, $t_{cp,1}$ and $t_{cp,2}$ denote an end point of a CP duration of the first symbol and an end point of a CP duration of the second symbol, respectively. $T_u$ denotes a length of a valid period of a symbol and $T_{CP}$ denotes a length of a CP duration of the symbol.

Figure 8:
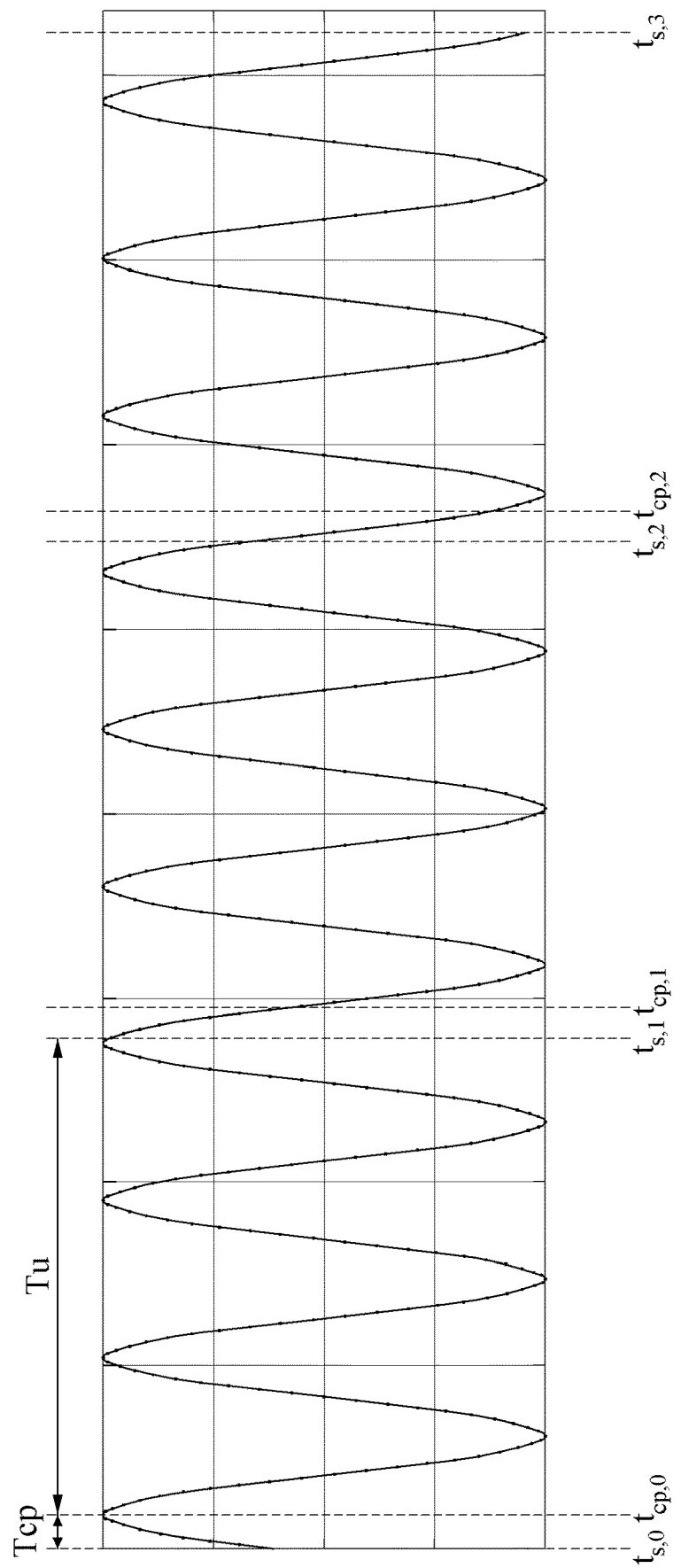
FIG. 8 illustrates an example of a reference signal generated by a base station according to at least one example embodiment.

During the valid period of the symbol ($T_u$), a phase of a sine wave may rotate by an integer multiple of $2\pi$ (e.g., if k=3, 2π×3=6π). Accordingly, a signal phase $\varphi_0$ at $t_{cp,0}$ that is the start point of the valid period of the zero-th symbol may be equal to a signal phase at $t_{s,1}^-$ that is the end point of the zero-th symbol. Here, $t_{s,1}^-$ may indicate a left limit of $t_{s,1}$ and $t_{s,1}^+$ may indicate a right limit of $t_{s,1}$. Referring to FIG. 8, a signal phase at $t_{s,1}^-$ may differ from a signal phase at $t_{s,1}^+$. While the signal phase may be $\Phi_{0At\, t_{s,1}^-}$, the signal phase may be $$\varphi_0 - 2\pi k \cdot \frac{T_{CP}}{T_u} \text{ at } t_{s,1}^+.$$

That is, the signal may be discontinuous at $t_{s,1}$.

If a normal CP is applied in a 4G or 5G system, $T_{cp}/T_u = 9/128$. Also, if an extended CP is applied in the 4G or 5G system, $T_{cp}/T_u = 1/4$.

The base station 110 may change a signal phase at $t_{cp,1}$ to differ from a signal phase at $t_{cp,0}$ such that a signal phase at $t_{s,1}^-$ may be equal to a signal phase at $t_{s,1}^+$. For example, if the signal phase at $t_{cp,1}$ is set to $$\varphi_0 + 2\pi k \cdot \frac{T_{CP}}{T_u},$$

the signal phase at $t_{s,1}^-$ may become equal to the signal phase at $t_{s,1}^+$. That is, the signal may be continuous at $t_{s,1}$. Generally describing, the base station 110 may set a sequence of a reference signal such that a phase of a sequence of an n-th symbol may be shifted by a phase corresponding to a CP duration of an (n−1)-th symbol compared to a phase of a sequence of the (n−1)-th symbol. Here, n denotes a natural number. In an LTE standard, n=1, 2, . . . 6. In a 5G NR standard, n denotes a random natural number.

For example, the base station 110 may determine the sequence of the reference signal to satisfy Equation 6.

$$X_\ell[k] = X_{\ell-1}[k] \cdot \exp\left(2\pi jk \cdot \frac{T_{CP,\ell-1}}{T_u}\right) \quad \text{[Equation 6]}$$

In Equation 6, $X_\ell[k]$ denotes a frequency domain complex exponentiation representing an initial phase and amplitude of a k-th subcarrier of and $\ell$-th symbol, $T_u$ denotes a length of a valid period of a symbol, and $T_{CP,\ell-1}$ denotes a length of a CP duration of an ($\ell-1$)-th symbol. Here, $\ell$ denotes a natural number. In the LTE standard, an index of a symbol may be counted for each slot. If a normal CP is used in the LTE standard, $\ell=1, 2, \ldots 6$. If an extended CP is used in the LTE standard, $\ell=1, 2, \ldots 5$. In the 5G NR standard, an index of a symbol may continuously increase in a time domain. Accordingly, in the 5G NR standard, $\ell$ may be a random natural number.

Referring to Equation 6, in a sequence of a reference signal, a sequence value corresponding to the $\ell$-th symbol may correspond to a value that is phase-shifted by $2\pi k$.

$$\frac{T_{CP,\ell-1}}{T_u}$$

from a sequence value corresponding to the ($\ell-1$)-th symbol. Differently representing, Equation 6, it may be expressed as Equation 7.

$$X_\ell[k] = X_0[k] \cdot \exp\left(2\pi jk \cdot \sum_{i=1}^{l} \frac{T_{CP,i-1}}{T_u}\right) \quad \text{[Equation 7]}$$

In Equation 7, $X_0[k]$ denotes a frequency domain complex exponentiation representing an initial phase and amplitude of a k-th subcarrier of an initial symbol (symbol index=0).

If the normal CP is applied, remaining symbols excluding a first symbol in 0.5 msec duration may be constant at length of CP duration/length of valid period of symbol=9/128. If the extended CP is applied, the remaining symbols may be constant at length of CP duration/length of valid period of symbol=1/4. They may apply not only to the LTE standard but also to the 5G NR standard.

Further, a length of accumulated CP duration to a length of a valid period of a symbol in 0.5 msec may be 1/2. That is, a phase shift amount corresponding to the accumulated CP duration in 0.5 msec may be $\frac{1}{2}\times 2\pi k = \pi k$. The phase shift amount $\pi k$ may correspond to a multiplication of $(-1)^k$. That is, in the LTE standard, if k is an odd number, a reference signal sequence component of a first symbol of an (s+1)-th slot and a reference signal sequence component of a first symbol of an s-th slot may have different signs. In contrast, in the LTE standard, if k is an even number, the reference signal sequence component of the first symbol of the (s+1)-th slot may be equal to the reference signal sequence component of the first symbol of the s-th slot.

In the LTE standard, a sequence component of a symbol not present at a start point of a slot may be phase-shifted from a sequence component of a previous symbol by $2\pi k \times 9/128$. If the normal CP is applied in the LTE standard, a sequence of a reference signal may be represented as Equation 8.

$$X_{s,\ell}[k] = (-1)^{s \cdot k} \varphi_{init}^k \cdot \exp\left(2\pi jk \cdot \ell \cdot \frac{T_{cp}}{T_u}\right) \quad \text{[Equation 8]}$$

In Equation 8, $\varphi_{init}^k$ denotes a frequency domain complex exponentiation representing an initial phase and amplitude of a k-th subcarrier of an initial symbol of an initial slot. Also, s denotes a slot index, $\ell$ denotes a symbol index, and $X_{s,\ell}[k]$ denotes a frequency domain complex exponentiation representing an initial phase and amplitude of a k-th subcarrier of an $\ell$-th symbol an s-th slot. If k is an even number, $(-1)^{s \cdot k}$ is 1 at all times. Therefore, an initial phase of a k-th subcarrier of a start symbol of a slot may be the same regardless of a slot index. In contrast, if k is an odd number, $(-1)^{s \cdot k}$ is −1 for s=odd number and 1 for s=even number. Therefore, the initial phase of the k-th subcarrier of the start symbol of the slot may vary based on a slot index. If the symbol index is $\ell$ is numbered for each slot, $\ell$ may be one of 0, 1, 2, . . . 6. Accordingly, P=$\ell$ and $$\frac{T_{cp}}{T_u} = 9/128.$$

If the normal CP is applied in the 5G NR standard, the sequence of the reference signal may be represented as Equation 9.

$$X_{s,\ell}[k] = (-1)^{s \cdot k \cdot \delta(\mu)} \varphi_{init}^k \cdot \exp\left(2\pi jk \cdot P \cdot \frac{T_{cp}}{T_u}\right), \quad \text{[Equation 9]}$$

$$P = \ell \bmod(7 \cdot 2^\mu), \mu = 0, 1, 2, 3 \ldots$$

In Equation 9, $\varphi_{init}^k$ denotes a frequency domain complex exponentiation representing an initial phase and amplitude of a k-th subcarrier of an initial symbol of an initial slot, and $X_{s,\ell}[k]$ denotes a frequency domain complex exponentiation representing an initial phase and amplitude of a k-th subcarrier of an $\ell$-th symbol of an s-th slot. Also, mod denotes a modulo function used to acquire a remainder. In the case of the normal CP of the LTE standard, numerology number $\mu=0$ and accordingly, P and $\ell=0, \ldots 6$. Also, $\delta(\mu)$ is a Dirac delta function hat is defined as 1 only if $\mu=0$. An index portion equation of −1 that determines a sign of a subcarrier, i.e., s·k·δ(μ), is defined if μ=0, that is, if a subcarrier spacing is 15 kHz. The index portion of −1 is 0 in other subcarrier spacings, that is, if μ>0. Therefore, start symbols of all of the subcarriers have a positive sign. If μ=0 and s*k=odd number, s·k·δ(μ) that is the index portion equation of −1 becomes an odd number and a start sign of a subcarrier becomes −1. That is, in the LTE standard or the 5G NR standard to which the subcarrier spacing of 15 kHz is applied, if k is an odd numbered subcarrier, a first symbol sign of each slot is +1 for slot number=even number and −1 for slot number=odd number. If the normal CP is applied, $$\frac{T_{cp}}{T_u} = 9/128.$$

In the 5G NR standard, if the symbol index is numbered based on a subframe unit and, in this instance, if subcarrier spacing=15 kHz, a sequence of a reference signal may be represented as Equation 10.

$$X_\ell[k] = (-1)^{s \cdot k} \varphi_{init}^k \cdot \exp\left(j\frac{9}{64}kP\pi\right) \quad \text{[Equation 10]}$$

$$s = \left[\frac{\ell}{7}\right], P = \ell \bmod 7$$

In Equation 10, $\varphi_{init}^k$ denotes a frequency domain complex exponentiation representing an initial phase and amplitude of a k-th subcarrier of an initial symbol of an initial slot, and $X_\ell[k]$ denotes a frequency domain complex exponentiation representing an initial phase and amplitude of a k-th subcarrier of an $\ell$-th symbol. s denotes a maximum integer less than or equal to $$\frac{\ell}{7}.$$

Here, the parameter s is redefined since a length of a slot is not 0.5 msec if subcarrier spacing=15 kHz in the 5G NR standard. Here, P denotes a remainder acquired by dividing $\ell$ by 7. For example, if $\ell$=10, s=1 and P=3.

In the 5G NR standard, if the subcarrier spacing is 15 kHz or higher (e.g., 30 kHz, 60 kHz, 120 kHz, 240 kHz), there is no need to change a sign of a sequence component based on a unit of 0.5 msec. Also, referring again to Equation 4, a length of a start symbol ($\ell$=0 or $\ell$=7·2$^\mu$) in 0.5 msec duration may differ from lengths of other symbols ($\ell \neq 0$ and $\ell \neq 7\cdot 2^\mu$). With the assumption that the normal CP is applied, if the subcarrier spacing is 15 kHz or higher in the 5G NR standard, a sequence of a reference signal may be represented as Equation 11.

$$\begin{cases} X_\ell[k] = \varphi_{init}^k & \ell = 0 \text{ or } \ell = 7 \cdot 2^\mu \\ X_\ell[k] = \varphi_{init}^k \cdot \exp\left(j\frac{9}{64}k\ell\pi\right) & \ell \neq 0 \text{ and } \ell \neq 7 \cdot 2^\mu \end{cases} \quad \text{[Equation 11]}$$

In Equation 11, μ denotes a parameter that determines a subcarrier spacing, $\varphi_{init}^k$ denotes a frequency domain complex exponentiation representing an initial phase and amplitude of a k-th subcarrier of an initial symbol of an initial slot, and $X_\ell[k]$ denotes a frequency domain complex exponen-tiation representing an initial phase and amplitude of a k-th subcarrier of an $\ell$-th symbol. Although numerology of the normal CP is applied in Equation 11, it is provided as an example only and the example embodiments are not limited thereto.

If the extended CP is applied in the LTE standard and the 5G NR standard, a sequence of a reference signal may be represented as Equation 12.

$$X_{s,\ell}[k] = (-1)^{s \cdot k} \varphi_{init}^k \cdot \exp\left(2\pi jk \cdot \ell \cdot \frac{T_{cp}}{T_u}\right), \text{ in } LTE \quad \text{[Equation 12]}$$

$$X_{s,\ell}[k] = \varphi_{init}^k \cdot \exp\left(2\pi jk \cdot \ell \cdot \frac{T_{cp}}{T_u}\right) \text{ in } 5GNR$$

In Equation 12, in the LTE standard, $\ell$ denotes a symbol index and may be 0 . . . 5. Also, in the 5G NR standard, $\ell$ denotes the symbol index and may be 0 . . . 11. Also, $\varphi_{init}^k$ denotes a frequency domain complex exponentiation representing an initial symbol of an initial slot, an initial phase and amplitude of a k-th subcarrier, and $X_{s,\ell}[k]$ denotes a frequency domain complex exponentiation representing an initial phase and amplitude of a k-th subcarrier of an $\ell$-th symbol of an s-th slot. If k is an odd numbered subcarrier, a first symbol sign of each slot is +1 for slot number=even number and −1 for slot number=odd number. If k is an even numbered subcarrier, all of start number signs of each slot are +1. In the 5G NR standard, a single slot may include 12 symbols and accumulated CP duration in the slot may be three times (1/4*12=3) of a valid period of a symbol. Accordingly, since a phase shift amount by the accumulated extended CP duration in a slot is 6πk, initial phases of k-th subcarriers in start symbols of different slots may be equal to each other. In the extended CP, $T_{cp}/T_u=1/4$.

If the symbol index is numbered for each subframe and the extended CP is applied, a sequence of a reference signal may be represented as Equation 13.

$$X_\ell[k] = (-1)^{s \cdot k} \varphi_{init}^k \cdot \exp\left(2\pi jk \cdot P \cdot \frac{T_{cp}}{T_u}\right), \quad \text{[Equation 13]}$$

$$s = \left[\frac{\ell}{6}\right], P = \ell \bmod 6 \text{ in } LTE$$

$$X_\ell[k] = \varphi_{init}^k \cdot \exp\left(2\pi jk \cdot P \cdot \frac{T_{cp}}{T_u}\right), P = \ell \bmod 24 \text{ in } 5GNR$$

In Equation 13, $\ell$ denotes a symbol index and may be 0 . . . 5. $\varphi_{init}^k$ it denotes a frequency domain complex exponentiation representing an initial phase and amplitude of a k-th subcarrier of an initial symbol of an initial slot, and $X_\ell[k]$ denotes a frequency domain complex exponentiation representing an initial phase and amplitude of a k-th sub-carrier of an $\ell$-th symbol. If 60 kHz subcarrier spacing is applied, P may be 0 . . . 23 in a symbol of the extended CP and $T_{cp}/T_u=1/4$.

FIG. 8 illustrates an example of a reference signal generated by the base station 110 according to at least one example embodiment.

Referring to FIG. 8, the base station 110 may generate a reference signal based on the sequence of the reference signal that is determined according to one of Equation 6 to Equation 13. Accordingly, a waveform of a subcarrier component of the reference signal of FIG. 8 may be continuous in a boundary between adjacent symbols, which differs from the example of FIG. 7. If the UE 130 performs an FFT, there may be no need to include an FFT window in a single symbol. That is, the UE 130 may move, that is, shift the FFT window without considering a boundary between symbols. The UE 130 may change a start point of a summation time interval that is proportional to a size of the FFT window in a time interval in which the reference signal is received, without considering the boundary between symbols. Accordingly, the UE 130 may acquire a sufficient number of snapshot vectors.

The UE 130 may acquire a plurality of snapshot vectors by shifting a summation time interval in a time domain based on a minimum time unit $T_s$ that is determined based on a sampling rate. For example, since a valid period of a symbol is 2048 $T_s$ based on an LTE standard, the UE 130 may change a start point of the summation time interval 2048 times within a valid period of a single symbol. The UE 130 may acquire a large number of snapshot vectors. The large number of snapshot vectors may be used to perform a super resolution algorithm.

Figure 9:
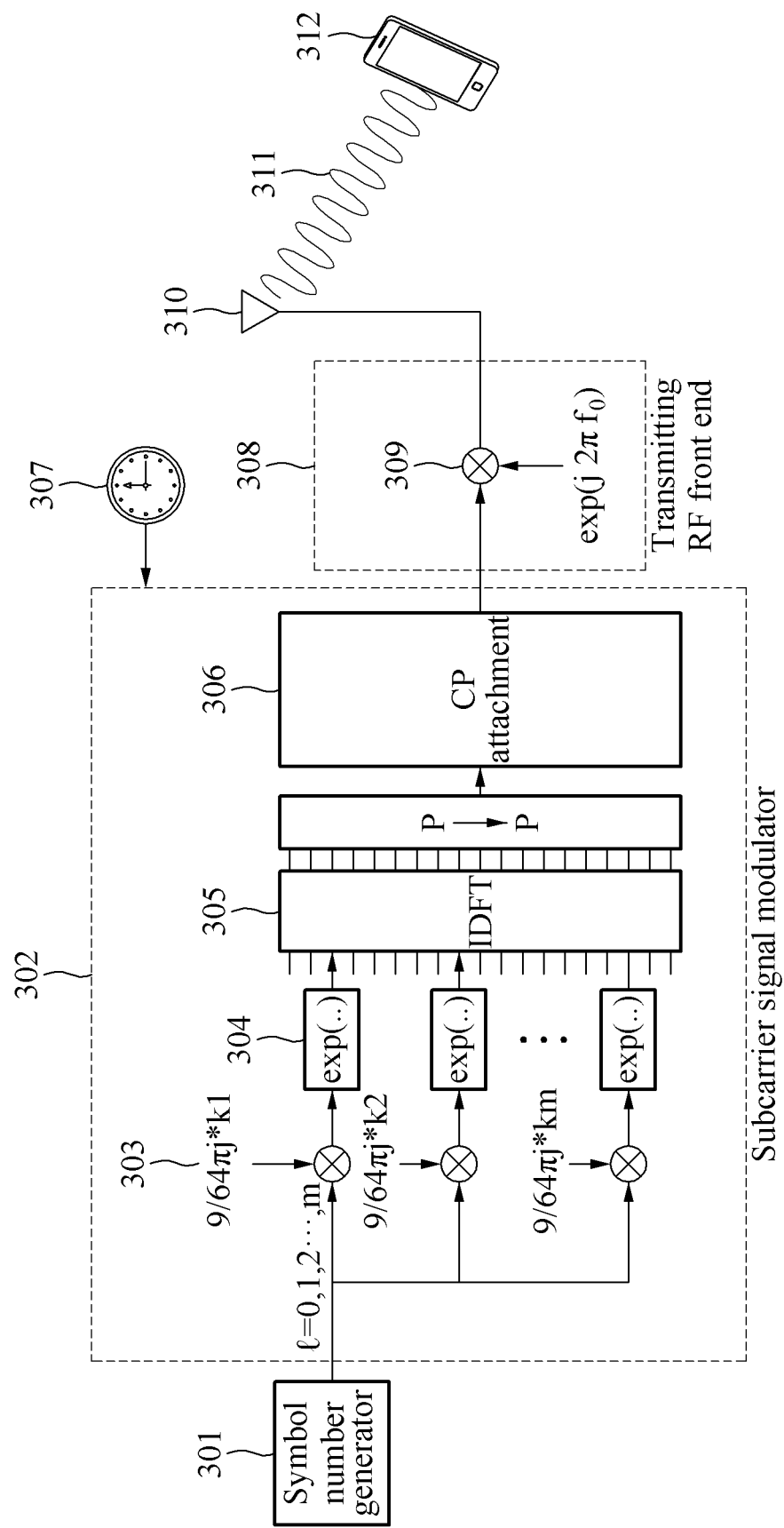
FIG. 9 is a block diagram illustrating an example of a configuration of a transmitter represented based on a functional unit according to at least one example embodiment.

FIG. 9 is a block diagram illustrating an example of a configuration of a transmitter represented based on a functional unit according to at least one example embodiment.

The transmitter of FIG. 9 may be included in an entity that transmits a reference signal. For example, if the base station 110 transmits a reference signal, the base station 110 may include the configuration of the transmitter of FIG. 9. As another example, if the UE 130 transmits a reference signal, the UE 130 may include the configuration of the transmitter of FIG. 9. Although components of the transmitter are classified based on a functional unit in FIG. 9, it is provided as an example only. The components are merely classified based on a corresponding function and may not be strictly classified in physical or logical terms.

Referring to FIG. 9, the transmitter may include a symbol number generator 301, a subcarrier signal modulator 302, a local oscillator 307, and a transmitting radio frequency (RF) front end 308. The symbol number generator 301 may receive information about a start point of a symbol from the local oscillator 307. The symbol number generator 301 may generate a symbol number sequence per a start point of a symbol and may forward the generated symbol number sequence to the subcarrier signal modulator 302. For example, if a subcarrier spacing is 15 kHz, the symbol number generator 301 may increase a symbol number by each one per 2,192 $T_s$. In a 4G standard or a 5G standard, 1 $T_s$ may be 32.552 nanoseconds. However, it is provided as an example only. In response to a modification in the standard, a length of 1 $T_s$ may vary. In the case of an LTE standard, a symbol number may be initialized to zero per 0.5 msec corresponding to a single slot length. For example, in the LTE standard, the symbol number generator 301 may cyclically generate a symbol number of 0 to 6 per 0.5 msec and may forward the generated symbol number to the subcarrier signal modulator 302.

In the 5GNR standard, a length of a slot may vary based on a subcarrier spacing. For example, if a subcarrier spacing is 15 kHz, the symbol number generator 301 may cyclically generate a symbol number of 0 to 13 per 1 msec and may forward the generated symbol number to the subcarrier signal modulator 302. The symbol number generator 301 may increase the symbol number per 2,192 $T_s$.

If the subcarrier spacing is 30 kHz, the symbol number generator 301 may cyclically generate a symbol number of 0 to 13 per 0.5 msec and may forward the generated symbol number to the subcarrier signal modulator 302. The symbol number generator 301 may increase the symbol number per 1,096 $T_s$.

If the subcarrier spacing is 60 kHz, the symbol number generator 301 may cyclically generate a symbol number of 0 to 13 per 0.25 msec and may forward the generated symbol number to the subcarrier signal modulator 302. The symbol number generator 301 may increase the symbol number per 548 $T_s$.

If the subcarrier spacing is 120 kHz, the symbol number generator 301 may cyclically generate a symbol number of 0 to 13 per 0.125 msec and may forward the generated symbol number to the subcarrier signal modulator 302. The symbol number generator 301 may increase the symbol number per 274 $T_s$.

If the subcarrier spacing is 240 kHz, the symbol number generator 301 may cyclically generate a symbol number of 0 to 13 per 0.0625 msec and may forward the generated symbol number to the subcarrier signal modulator 302. The symbol number generator 301 may increase the symbol number per 137 $T_s$.

If an extended CP is applied in an LTE system, the symbol number generator 301 may increase the symbol number per 2,560 $T_s$. The symbol number generator 301 may cyclically generate a symbol number of 0 to 5 per 0.5 msec and may forward the generated symbol number to the subcarrier signal modulator 302.

If the extended CP is applied in a 5G NR system, the symbol number generator 301 may increase the symbol number per 640 $T_s$. The symbol number generator 301 may cyclically generate a symbol number of 0 to 11 per 0.25 msec and may forward the generated symbol number to the subcarrier signal modulator 302.

The subcarrier signal modulator 302 may receive the symbol number from the symbol number generator 301. Referring to Equation 6 to Equation 13, if a normal CP is applied, $$\frac{T_{cp}}{T_u} = 9/128.$$

Therefore, every time the symbol number increases, a phase shift amount of a sequence component of a reference signal may be $$2\pi k \cdot \frac{T_{CP}}{T_u} = \frac{9}{64}k\pi.$$

A phase shift amount determiner 303 determines a phase shift amount of a reference signal sequence component based on the symbol number. For example, if a symbol number is $\ell$ and a subcarrier index is $k_1$, the phase shift amount determiner 303 may determine a phase shift amount of a corresponding reference signal sequence component as $$\frac{9}{64}k\ell\pi.$$

A complex exponentiation generator 304 may generate a complex exponentiation corresponding to the phase shift amount determined by the phase shift amount determiner 303 and may calculate a sequence of the reference signal based on the generated complex exponentiation. For example, the complex exponentiation generator 304 may generate a complex exponentiation exp $$\left(\frac{9}{64}jk\ell\pi\right)$$

corresponding to a phase shift amount $$\frac{9}{64}k\ell\pi$$

and may calculate a sequence of a reference signal based on the generated complex exponentiation. The sequence of the reference signal generated by the complex exponentiation generator 304 may follow at least one of Equation 6 to Equation 13. The sequence of the reference signal calculated by the complex exponentiation generator 304 may be forwarded to an inverse discrete Fourier transform (IDFT) 305. The IDFT 305 may perform an IDFT operation based on the reference signal sequence. A CP attachment 306 may duplicate last data corresponding to a CP length of a symbol in data present in a valid period of the symbol and may attach the duplicated data to a front portion of the symbol.

A baseband signal sample generated by the subcarrier signal modulator 302 may be modulated to a radio frequency (RF) carrier signal of a passband by the transmitting RF front end 308 and then transmitted through a transmitting antenna 310. If the baseband signal is not modulated to the passband signal, the transmitting RF front end 308 may be omitted. As described above, the transmitter may determine the sequence of the reference signal and may transmit the reference signal based on the determined reference signal sequence, such that the reference signal may be continuous in a boundary between symbols. Although the example embodiment of FIG. 9 is described based on an example in which $$2\pi k \cdot \frac{T_{CP}}{T_u} = \frac{9}{64}k\pi$$

with the assumption that a normal CP is applied, it is provided as an example only. For example, if an extended CP is applied, a phase shift amount according to an i crease in the symbol number may be a value different from $\frac{9}{64}k\pi$.

Hereinafter, a method of estimating, by a receiver, a reception delay time of a reference signal according to at least one example embodiment will be described.

Referring again to FIG. 3, in the multipath environment, a reception delay time of a reference signal may differ in each of a plurality of paths. In the multipath environment, a time domain propagation delay model may be represented as Equation 14.

$$h(t) = h_1^a \delta(t-\tau_1) + h_2^a \delta(t-\tau_2) + \ldots h_l^a \delta(t-\tau_1) = \sum_{p=1}^{l} h_p^a \delta(t-\tau_p)$$ [Equation 14]

In Equation 14, l denotes a number of multipaths, $h_a^n$ denotes a strength component of a signal that passes an n-th path, a function $\delta(\ )$ denotes an impulse function, and $\tau_n$ denotes a reception delay time of a reference signal in the n-th path.

Referring to Equation 14, in the multipath environment, the propagation delay model h(t) may be represented as a linear combination of impulse functions depending on the reception delay time $\tau_n$ of the multipath.

It may be assumed that a signal transmitted from the transmitter passes through a channel of which channel delay by the multipath is $[\tau_{a1}, \tau_{a2}, \ldots \tau_{a\ell}]$ and thereby arrives at the UE 130. In this case, a channel that applies to a k-th subcarrier signal of the signal transmitted from the transmitter may be represented as Equation 15.

$$H_a(\omega_k) = h_1^a e^{-i\omega_k \tau_1} + h_2^a e^{-i\omega_k \tau_2} + \ldots h_l^a e^{-i\omega_k \tau_l} = \sum_{p=1}^{l} h_p^a e^{-i\omega_k \tau_p}$$ [Equation 15]

In Equation 15, $H_a(\omega_k)$ denotes a channel for a k-th subcarrier and $h_n^a$ denotes a strength component of a signal that passes an n-th path. If the transmitter transmits a signal using m orthogonal subcarriers, the channel of Equation 15 may be represented as a matrix of Equation 16.

$$H_a = \begin{bmatrix} H_a(\omega_1) \\ H_a(\omega_2) \\ \vdots \\ H_a(\omega_m) \end{bmatrix} = \begin{bmatrix} e^{-i\omega_1\tau_1} & e^{-i\omega_1\tau_2} & \ldots & e^{-i\omega_1\tau_l} \\ e^{-i\omega_2\tau_1} & e^{-i\omega_2\tau_2} & \ldots & e^{-i\omega_2\tau_l} \\ \vdots & \vdots & \ddots & \vdots \\ e^{-i\omega_m\tau_1} & e^{-i\omega_m\tau_2} & \ldots & e^{-i\omega_m\tau_l} \end{bmatrix} \begin{bmatrix} h_1^a \\ h_2^a \\ \vdots \\ h_l^a \end{bmatrix}$$ [Equation 16]

In Equation 16, $H_a$ denotes a channel response with respect to the entire subcarriers, $H_a(\omega_k)$ denotes a channel for a subcarrier having an angular frequency of $\omega_k$, and $[h_1^a, h_2^a, h_3^a, \ldots h_l^a]$ denotes a size component for each multipath of the channel $H_a$. If m orthogonal subcarriers are provided at identical intervals, the matrix of Equation 16 may be represented as a Vandermonde matrix in which each of columns is a geometric progression. If $H_a$ is represented as the Vandermonde matrix, the UE 130 may further easily perform a calculation by applying a super resolution algorithm, such as, for example, a multiple signal classification (MUSIC) algorithm, a MinNorm algorithm, an estimation of signal parameters via rotational invariance techniques (ESPRIT) algorithm, and the like.

When a size of an FFT window is represented as N discrete times with the assumption that the m orthogonal subcarriers are provided at constant intervals, an angular frequency of each of the subcarriers may be represented as Equation 17.

$$\omega_k = 2\pi r \frac{k}{N}$$ [Equation 17]

Referring to Equation 16 and Equation 17, the channel matrix $H_a$ may be represented as Equation 18.

$$\therefore H_a = \begin{bmatrix} e^{-i1\cdot 2\pi r\tau_1/N} & e^{-i1\cdot 2\pi r\tau_2/N} & \ldots & e^{-i1\cdot 2\pi r\tau_l/N} \\ e^{-i2\cdot 2\pi r\tau_1/N} & e^{-i2\cdot 2\pi r\tau_2/N} & \ldots & e^{-i2\cdot 2\pi r\tau_l/N} \\ \vdots & \vdots & \ddots & \vdots \\ e^{-im\cdot 2\pi r\tau_1/N} & e^{-im\cdot 2\pi r\tau_2/N} & \ldots & e^{-im\cdot 2\pi r\tau_l/N} \end{bmatrix} \begin{bmatrix} h_1^a \\ h_2^a \\ \vdots \\ h_l^a \end{bmatrix} =$$ [Equation 18]

$$\begin{bmatrix} e^{-i\theta_1} & e^{-i\theta_2} & \ldots & e^{-i\theta_l} \\ e^{-i2\theta_1} & e^{-i2\theta_2} & \ldots & e^{-i2\theta_l} \\ \vdots & \vdots & \ddots & \vdots \\ e^{-im\theta_1} & e^{-im\theta_2} & \ldots & e^{-im\theta_l} \end{bmatrix} \begin{bmatrix} h_1^a \\ h_2^a \\ \vdots \\ h_l^a \end{bmatrix} = A_a \begin{bmatrix} h_1^a \\ h_2^a \\ \vdots \\ h_l^a \end{bmatrix}, \theta_p = 2\pi r \frac{\tau_p}{N}$$

Referring to Equation 18, the channel matrix $H_a$ may be represented as a multiplication of a matrix $A_a$ and a matrix

[$h_1^a, h_1^a, h_3^a, \ldots h_\ell^a$]$^T$ that represents a size component of a multipath. Here, each of columns of the matrix $A_a$ may be a geometric progression. The transmitter, for example, the base station 110 may transmit a reference signal using a plurality of subcarriers that is spaced apart at identical intervals. In this case, since the channel matrix $H_a$ becomes the Vandermonde matrix, the UE 130 may estimate a reception delay time of the reference signal by readily applying the super resolution analysis algorithm.

Referring again to FIG. 9, the reference signal generated by the subcarrier signal modulator 302 may include a plurality of subcarrier signals. A waveform of each of the plurality of subcarrier signals may be continuous during the plurality of symbol periods in a time domain. Also, the plurality of subcarrier signals may be provided at identical intervals in a frequency domain. A case in which the plurality of subcarrier signals is provided at identical intervals in the frequency domain may also include a case in which the plurality of subcarrier signals is adjacent to each other in the frequency domain.

A baseband signal generated by the subcarrier signal modulator 302 may be represented at a time t according to Equation 19.

$$s_a(t) = A_1 e^{i(\omega_1 t + \varphi_1)} + A_2 e^{i(\omega_2 t + \varphi_2)} + \ldots + A_m e^{i(\omega_m t + \varphi_m)} = \sum_{p=1}^{m} A_p e^{i(\omega_p t + \varphi_p)}$$ [Equation 19]

In Equation 19, $s_a(t)$ denotes the baseband signal at the time t, and $A_p$ denotes a modulated strength component of a subcarrier signal having an angular frequency $\omega_p$. In Equation 19, a domain of the time t may correspond to a time interval in which the reference signal is transmitted. For example, if the reference signal continues during n symbol periods, t may be one of values between 0 and $n \times (T_u + T_{CP})$.

In the following, with the assumption that normalization of $A_p = 1$ is performed, expression of $A_p$ is omitted. However, it is provided as an example only. Unless the normalization of $A_p = 1$ is performed, the following equations may be available within the range easily modifiable by one of ordinary skill in the art by further using $A_p$. The baseband signal of Equation 19 may be modulated to a passband RF carrier signal by the transmitting RF front end 308. The modulated signal may be transmitted through the transmitting antenna 310.

Figure 10:
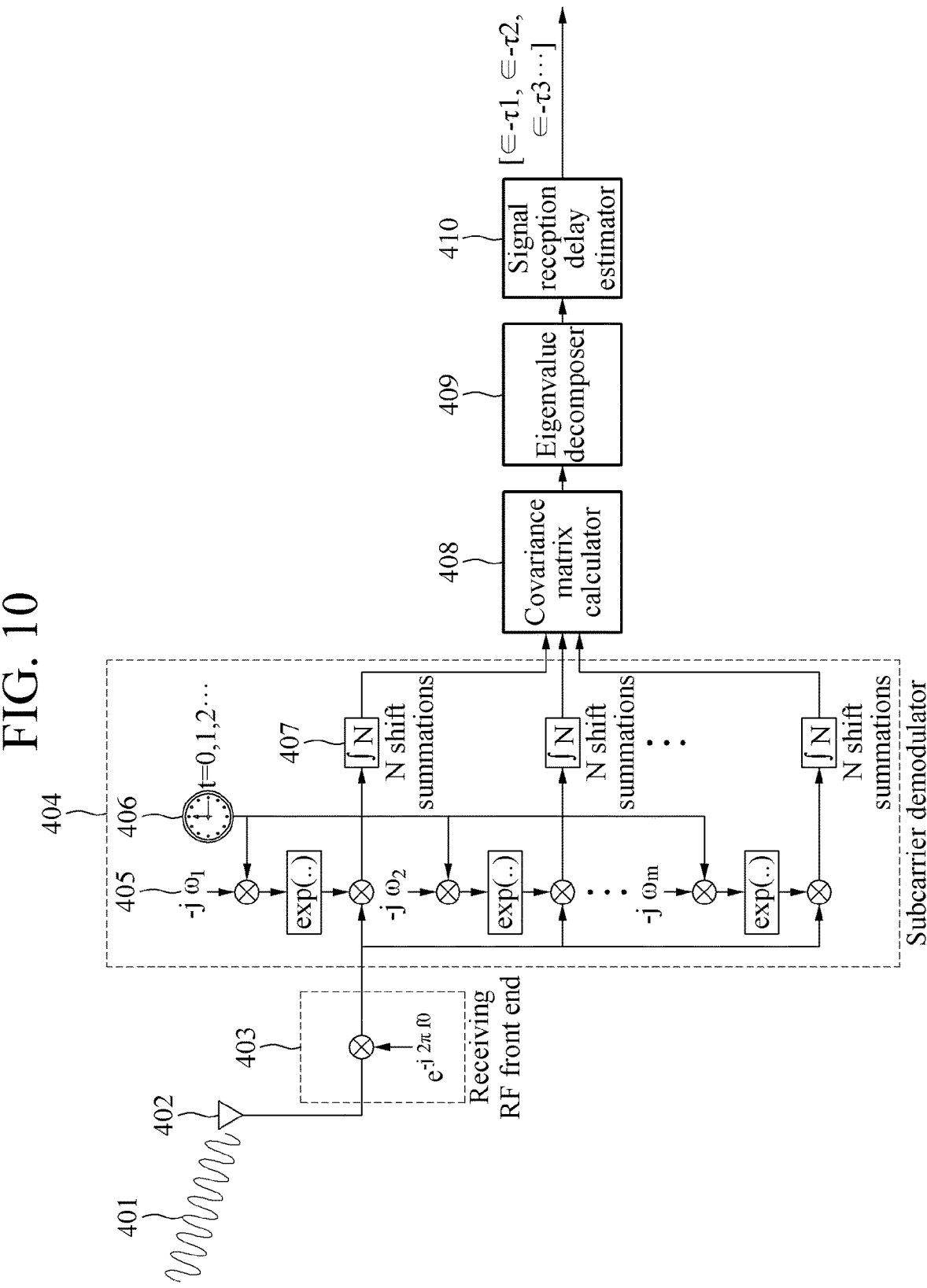
FIG. 10 is a block diagram illustrating an example of a configuration of a receiver represented based on a functional unit according to at least one example embodiment.

FIG. 10 is a block diagram illustrating an example of a configuration of a receiver represented based on a functional unit according to at least one example embodiment.

The receiver of FIG. 10 may be included in an entity that receives a reference signal. For example, if the UE 130 transmits a reference signal, the UE 130 may include the configuration of the receiver of FIG. 10. As another example, if the base station 110 transmits a reference signal, the base station 110 may include the configuration of the receiver of FIG. 10. Although components of the receiver are classified based on a functional unit in FIG. 10, it is provided as an example only. The components are merely classified based on a corresponding function and may not be strictly classified in physical or logical terms.

Referring to FIG. 10, the receiver may include a receiving RF front end 403, a subcarrier demodulator 404, a covariance matrix calculator 408, an eigenvalue decomposer 409, and a Signal reception delay estimator 410.

The receiving RF front end 403 may convert a passband signal 401 received at a receiving antenna 402 to a baseband signal. The receiving RF front end 403 may multiply a data value of a received signal by a complex exponentiation $e^{-2\pi f^0}$ to convert the passband signal to the baseband signal. During this process, a carrier component corresponding to a passband may be removed. If the received signal is already the baseband signal or if the received signal is modulated without performing the process of converting the passband signal to the baseband signal, the receiving RF front end 403 may be omitted.

The subcarrier demodulator 404 may extract received signal data corresponding to N sample times in a summation time interval. A local oscillator 406 may generate a sample sequence number that gradually increases every time a sample time passes. The sample sequence number may correspond to a timing index that denotes a sample time. The sample time may be determined based on a sampling rate. The local oscillator 406 may forward the sample sequence number to a complex conjugate number calculator 405. The complex conjugate number calculator 405 may identify a start point of a summation time interval based on the sample sequence number. For example, if the start point of the summation time interval is m, the complex conjugate number calculator 405 may calculate, for each subcarrier, complex conjugate number values corresponding to N sample points in times starting from a point in time of which the sample sequence number is m. A shift summation calculator 407 may multiply the complex conjugate number values corresponding to the N sample points in times by sample data values of a received signal corresponding to the N sample points in the summation time interval, respectively, and may sum up multiplication result values. It will be further described below. The shift summation calculator 407 may calculate a snapshot vector by summing up the multiplication result values acquired in a single summation time interval. The shift summation calculator 407 may calculate a plurality of snapshot vectors by shifting the start point of the summation time interval.

The shift summation calculator 407 may forward the plurality of snapshot vectors to the covariance matrix calculator 408. The covariance matrix calculator 408 may calculate a covariance matrix based on the plurality of snapshot vectors. The eigenvalue decomposer 409 may calculate an eigenvalue and an eigenvector of the covariance matrix. The Signal reception delay estimator 410 may estimate a reception delay time of the reference signal based on the eigenvector of the covariance matrix.

Hereinafter, with the assumption that the receiver is the UE 130, a method of estimating, by the UE 130, the reception delay time of the reference signal is described.

Figure 11:
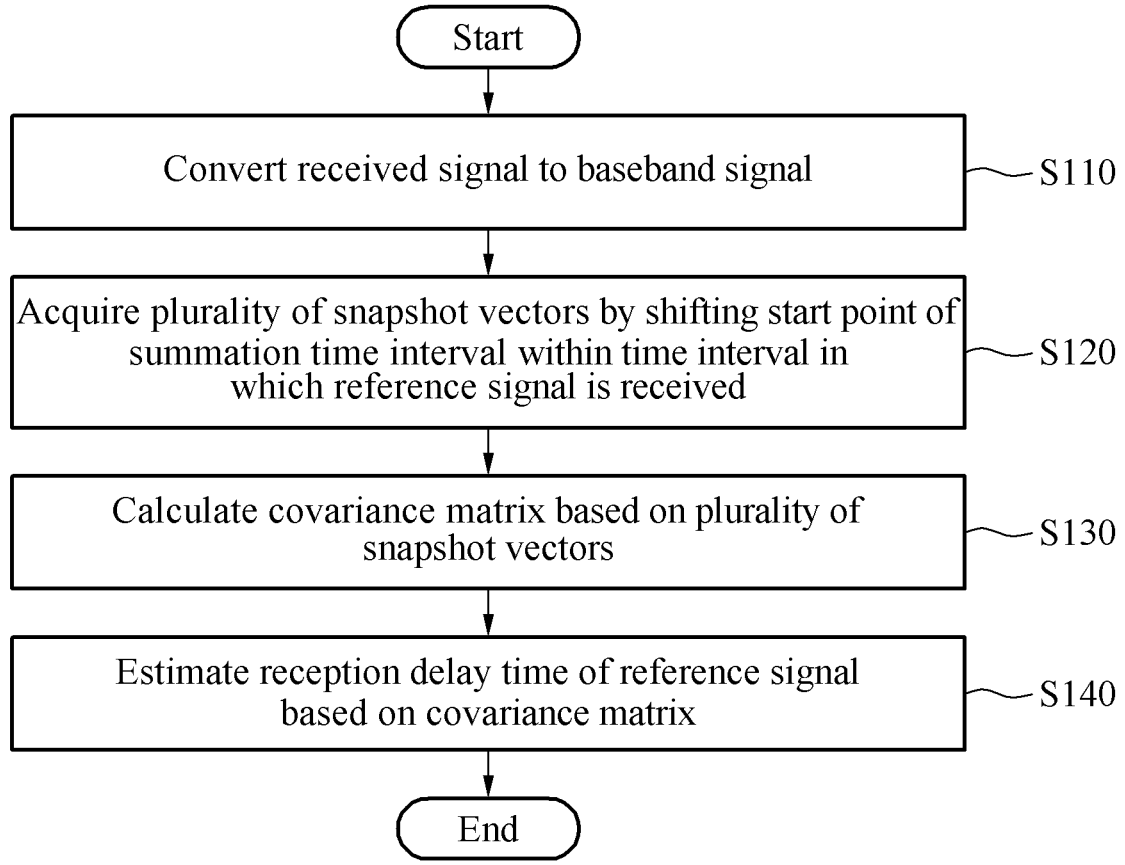
FIG. 11 is a flowchart illustrating an example of a method of estimating, by a UE, a reception delay time of a reference signal according to at least one example embodiment.

FIG. 11 is a flowchart illustrating an example of a method of estimating, by the UE 130, a reception delay time of a reference signal according to at least one example embodiment.

Referring to FIG. 11, in operation S110, the UE 130 may convert a received signal to a baseband signal. The UE 130 may multiply a data value of the received signal by a complex exponentiation $e^{-2\pi f^0}$. Here, a value of $f^0$ may vary based on a passband through which a transmitter transmits a signal. During this process, a carrier component corresponding to the passband may be removed. If the received signal received at the UE 130 is already the baseband signal or modulated without performing a process of converting the passband signal to the baseband signal, operation S110 may be omitted.

In operation S120, the UE 130 may acquire a plurality of snapshot vectors by shifting a start point of a summation time interval in a time interval in which a reference signal is received. Each of the plurality of snapshot vectors may correspond to a different summation time interval. If a waveform of each of subcarrier signals included in the reference signal is continuous regardless of a boundary between symbols, the UE 130 may shift the start point of the summation time interval without considering the boundary between symbols. For example, the UE 130 may shift the start point of the summation time interval based on a sample time unit that is determined based on a sampling rate. As another example, the UE 130 may shift the start point of the summation time interval based on a multiple unit of a sample time. However, they are provided as examples only. If a waveform of each of subcarrier signal included in the reference signal is continuous, the UE 130 may acquire a plurality of snapshot vectors by shifting the start point of the summation time interval based on the sample time unit within a single symbol. A length of the summation time interval may be less than a length of a time interval in which the UE 130 receives the reference signal.

Figure 12:
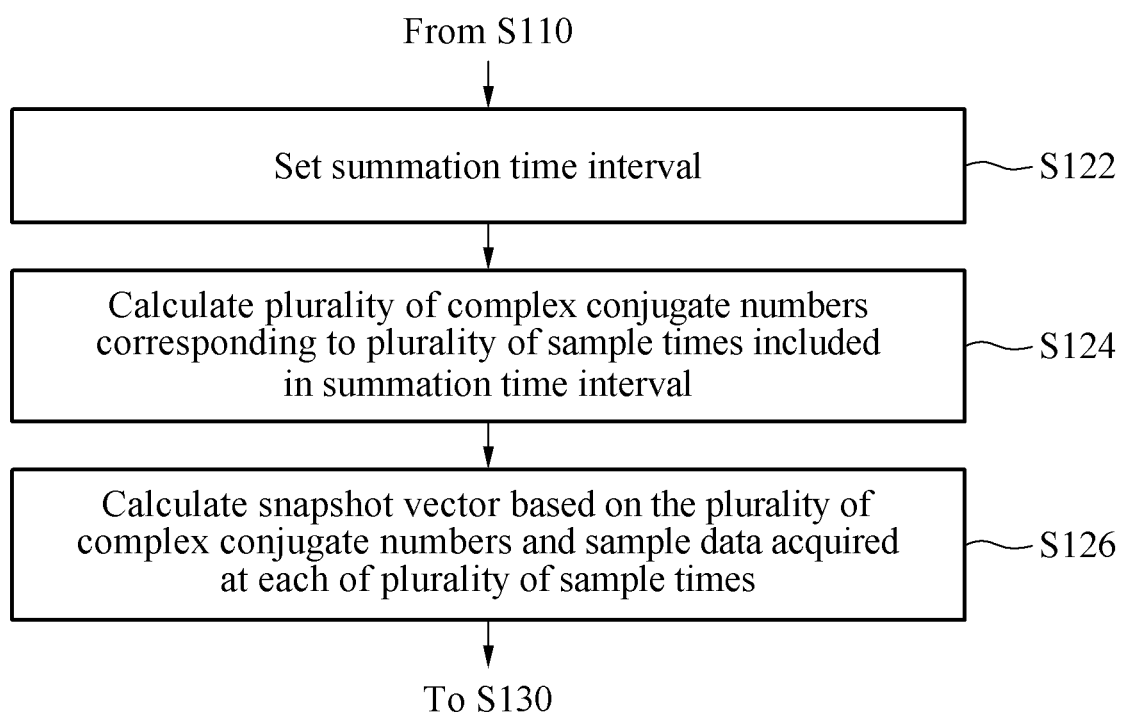
FIG. 12 is a flowchart illustrating an example of a process of performing operation S120 of FIG. 11.

FIG. 12 is a flowchart illustrating an example of a process of performing operation S120 of FIG. 11.

Referring to FIG. 12, in operation S122, the UE 130 may set the summation time interval. The UE 130 may include the summation time interval in the time interval in which the reference signal is received. For example, it may be assumed that the UE 130 receives a continuous reference signal during n symbols. If a point in time at which reception of the reference signal starts is set to be 0, a sample time t may be one of values between 0 and $n \times (T_u + T_{CP})$ in the time interval in which the reference signal is received. If a point in time at which the summation time interval starts is 0, the sample time t may be one of values between 0 and N−1 in the summation time interval. Here, N may be proportional to a size of an FFT window. For example, N may correspond to a size of a time domain corresponding to a multiple number of the FFT window. The UE 130 may shift the start point of the summation time interval. For example, if the start point of the summation time interval is m, the sample time t may be one of values between m and m+N−1 in the summation time interval.

In operation S124, the UE 130 may calculate a plurality of complex conjugate numbers corresponding to a plurality of sample times included in the summation time interval. Referring again to FIG. 10 for description related thereto, baseband signal data forwarded from the receiving RF front end 403 to the subcarrier demodulator 404 may be represented as Equation 20.

$$y_a(t) = \sum_{p=1}^{m} e^{i(\omega_p t + \varphi_p)} H_a(\omega_p) \quad \text{[Equation 20]}$$

In Equation 20, $H_a(\omega_p)$ denotes a channel for a subcarrier having an angular frequency $\omega_p$, which is described above with reference to Equation 15 and Equation 16, and $\varphi_p$ denotes an initial phase component of a p-th subcarrier signal of the transmitter. If synchronization is not accurately performed between the base station 110 and the UE 130, the UE 130 may not secure information about $\varphi_p$.

In Equation 20, a value of t may be one of values between 0 and $n \times (T_u + T_{CP})$, which is described above. With the assumption that the start point in time of the summation time interval is t, reception data collected at each of N sample times included in the summation time interval may be represented in a vector form according to Equation 21.

$$Y_a(t) = [y_a(t) y_a(t-1) \ldots y_a(t-N+1)] \quad \text{[Equation 21]}$$

In Equation 21, $Y_a(t)$ denotes a vector that represents reception data collected in the summation time interval of which the start point in time is t, and $y_a(t)$ denotes a reception data value of the reference signal at the time t.

Complex conjugate numbers of a subcarrier corresponding to N sample times in the summation time interval may be represented in a vector form according to Equation 22.

$$\text{DFT}_k(t) = [e^{-i\omega_k(t-\epsilon)} e^{-i\omega_k(t-\epsilon-1)} \ldots e^{-i\omega_k(t-\epsilon-N+1)}] \quad \text{[Equation 22]}$$

In Equation 22, $\omega_k$ denotes an angular frequency of a k-th subcarrier, $\text{DFT}_k(t)$ denotes a vector that represents complex conjugate numbers of a k-th subcarrier corresponding to N sample times included in the summation time interval of which the start point is t, and $\epsilon$ denotes a timing offset occurring due to a synchronization error between the receiver and the transmitter, for example, between the UE 130 and the base station 110.

In operation S126, the UE 130 may calculate a snapshot vector based on the plurality of complex conjugate numbers and sample data acquired at each of the plurality of sample times. The UE 130 may multiply the plurality of complex conjugate numbers and the plurality of sample data values, respectively, and may sum up multiplication result values. The aforementioned operation process may be represented as an inner product operation of a vector according to Equation 23.

$$\text{DFT}_k(t) \cdot Y_a(t) = N \cdot e^{i(\omega_k \epsilon + \varphi_k)} H_a(\omega_k) + \sigma$$

$$\therefore \text{DFT}_k(t) \cdot y_a(t) = N \cdot H_a(\omega_k) e^{i(\omega_k \epsilon + \varphi_k)} + \sigma \quad \text{[Equation 23]}$$

In Equation 23, $\omega_k$ denotes an angular frequency of a k-th subcarrier, $\text{DFT}_k(t)$ denotes a vector that represents complex conjugate numbers of the k-th subcarrier corresponding to N sample times included in the summation time interval of which the start point in time is t, $y_a(t)$ denotes a data value of a received signal at the time t, N denotes a length of the summation time interval, $\epsilon$ denotes a timing offset occurring due to a synchronization error between the receiver and the transmitter, for example, between the UE 130 and the base station 110, $\varphi_k$ denotes an initial phase component of the k-th subcarrier signal of the transmitter, and $H_a(\omega_k)$ denotes a channel for the k-th subcarrier.

Referring to Equation 23, an inner product result of $\text{DFT}_k(t)$ and $Y_a(t)$ may be represented as a multiplication of $H_a(\omega_k)$ and a term $e^{i(\omega_k \epsilon + \varphi_k)}$ depending on the initial phase component of the k-th subcarrier and a summation of the error component $\sigma$. In Equation 23, it can be verified that $N \cdot H_a(\omega_k) e^{i(\omega_k \epsilon + \varphi_k)}$ does not depend on the time t. Also, $\sigma$ may be an error that degrades positioning precision as an interference component caused by noise and other orthogonal subcarrier components. Here, during a process of calculating an expectation value of the covariance matrix based on the plurality of snapshot vectors, the effect by the error component $\sigma$ may be offset and decrease. For example, the UE 130 may calculate the expectation value of the covariance matrix based on the plurality of snapshot vectors that is acquired in a plurality of summation time intervals of which start points in times are t, t+1, t+2, t+3 . . . , respectively. This process may include a process of calculating an average value. During the process of calculating an average, error components of different snapshot vectors may be offset and a level of contribution that the error components make to a calculation result of the covariance matrix may decrease. Accordingly, the following covariance matrix may depend on $N \cdot H_a(\omega_k) e^{i(\omega_k \epsilon + \varphi_k)}$ that substantially does not depend on the time t in Equation 23.

In the aforementioned example embodiment, only a single subcarrier signal having the angular frequency $\omega_k$ is considered. Assuming that the reference signal transmitted from the base station 110 includes m subcarrier signals and the m subcarrier signals are provided at identical intervals, Equation 23 may be generalized to Equation 24.

[Equation 24]

$$Y_A = \begin{bmatrix} DFT_1(t) \\ DFT_2(t) \\ \vdots \\ DFT_m(t) \end{bmatrix} \cdot y_a = N \begin{bmatrix} H_a(\omega_1)e^{i(\omega_1\epsilon+\varphi_1)} \\ H_a(\omega_2)e^{i(\omega_2\epsilon+\varphi_2)} \\ \vdots \\ H_a(\omega_m)e^{i(\omega_m\epsilon+\varphi_m)} \end{bmatrix} + \sigma =$$

$$N \cdot \text{diag} \begin{bmatrix} e^{i\varphi_1} \\ e^{i\varphi_2} \\ \vdots \\ e^{i\varphi_m} \end{bmatrix} \begin{bmatrix} e^{i\omega_1(\epsilon-\tau_1)} & e^{i\omega_1(\epsilon-\tau_2)} & \cdots & e^{i\omega_1(\epsilon-\tau_l)} \\ e^{i\omega_2(\epsilon-\tau_1)} & e^{i\omega_2(\epsilon-\tau_2)} & \cdots & e^{i\omega_2(\epsilon-\tau_l)} \\ \vdots & \vdots & \ddots & \vdots \\ e^{i\omega_m(\epsilon-\tau_1)} & e^{i\omega_m(\epsilon-\tau_2)} & \cdots & e^{i\omega_m(\epsilon-\tau_l)} \end{bmatrix} \begin{bmatrix} h_1^a \\ h_2^a \\ \vdots \\ h_l^a \end{bmatrix} + \sigma$$

In Equation 24, $Y_A$ denotes a snapshot vector, $\omega_k$ denotes an angular frequency of a k-the subcarrier, $DFT_k(t)$ denotes a vector that represents complex conjugate numbers of the k-th subcarrier corresponding to N sample times included in a summation time interval of which a start point in time is t, $y_a(t)$ denotes a data value of a received signal at the time t, N denotes a length of the summation time interval, $\epsilon$ denotes a timing offset occurring due to a synchronization error between the receiver and the transmitter, for example, between the UE 130 and the base station 110, $\varphi_k$ denotes an initial phase component of the k-th subcarrier signal of the transmitter, $H_a(\omega_k)$ denotes a channel for the k-th subcarrier, $\tau_p$ denotes a signal reception delay time of a p-th path, $\sigma$ denotes an error component, $h_a^p$ denotes a signal strength component of the p-th path, and diag[ . . . ] denotes a diagonal matrix. All of the remaining components excluding diagonal components in the diagonal matrix may be zeroes.

Referring to Equation 24, the snapshot vector may be represented as a multiplication of a plurality of matrices. Here, at least one of the plurality of matrices may be a Vandermonde matrix. That is, the UE 130 may represent the snapshot vector as the multiplication of the plurality of matrices. The UE 130 may represent the snapshot vector as a multiplication of the Vandermonde matrix and at least one another matrix. For example, an intermediate matrix present in a last row of Equation 24 may be the Vandermonde matrix. Each column of the intermediate matrix may constitute a geometric progression.

A steering vector may be used to further simplify Equation 24 and may be represented as Equation 25.

$$a(\tau_p) = [e^{-\omega_1(\epsilon-\tau_p)} e^{-\omega_2(\epsilon-\tau_p)} \ldots e^{-\omega_m(\epsilon-\tau_p)}] \quad \text{[Equation 25]}$$

In Equation 25, $\tau_p$ denotes a signal reception delay time of a p-th path, $a(\tau_p)$ denotes a steering vector corresponding to the p-th path, and E denotes a timing offset between the base station 110 and the UE 130.

Using Equation 24 and Equation 25, the snapshot vector $Y_A$ may be represented as Equation 26.

$$A_a = [a(\tau_1) \ a(\tau_2) \ \ldots \ a(\tau_l)] \quad \text{[Equation 26]}$$

$$\therefore Y_A = N \cdot \text{diag} \begin{bmatrix} e^{i\varphi_1} \\ e^{i\varphi_2} \\ \vdots \\ e^{i\varphi_m} \end{bmatrix} A_a \begin{bmatrix} h_1^a \\ h_2^a \\ \vdots \\ h_l^a \end{bmatrix} + \sigma$$

Referring to Equation 26, a remaining part excluding the error component $\sigma$ from the snapshot vector $Y_A$ may not depend on the time t. Therefore, except for a special case, such as, for example, a case in which the UE 130 moves at a fast speed, the remaining part excluding the error component $\sigma$ from the snapshot vector $Y_A$ may be invariable, that is, constant regardless of the time t.

To acquire a plurality of snapshot vectors, the UE 130 may repeatedly perform operations S122 to S126. Every time a new snapshot vector is acquired, the UE 130 may set a new summation time interval in operation S122. The UE 130 may acquire the plurality of snapshot vectors by shifting the start point of the summation time interval. For example, the UE 130 may acquire the plurality of snapshot vectors by shifting the start point of the summation time interval to t, t+1, t+2, . . . .

In a first summation time interval corresponding to the start point of the summation time interval=t, a sample time may be one of values between t and t+N−1. In a second summation time interval corresponding to the start point of the summation time interval=t+1, a sample time may be one of values between t+1 and t+N. The UE 130 may calculate a first snapshot vector corresponding to the first summation time interval. Also, the UE 130 may calculate a second snapshot vector corresponding to the second summation time interval. The UE 130 may reduce a process of calculating the second snapshot vector by reusing at least a portion of a process of calculating the first snapshot vector. For example, the UE 130 may omit a calculation process with respect to time intervals t+1 to t+N−1 in which the first summation time interval and the second summation time interval overlap. The UE 130 may calculate the second snapshot vector by performing an additional calculation only with respect to the time t+N in which the second summation time interval and the first summation time interval do not overlap. Accordingly, an amount of time and resources used for the UE 130 to calculate the plurality of snapshot vectors may decrease.

A method of acquiring, by the UE 130, a snapshot vector is not limited to the aforementioned example embodiments. For example, the UE 130 may extract a plurality of subcarrier waveforms using a filter bank that includes peak filters each configured to extract a sine wave component for each subcarrier. As another example, the UE 130 may employ a DFT filter method for restoring a plurality of subcarrier waveforms using a finite impulse response (FIR) filter bank configured as DFT coefficients corresponding to a size of a FFT window. The UE 130 may employ a variety of methods, for example, a sliding FFT filter method for collecting N-length sample groups in a time domain sample, performing an FFT on the collected sample groups, and continuously extraction only a plurality of subcarrier components therefrom.

Since the aforementioned methods need to repeat a complex multiplication operation corresponding to the size of the FFT window every time an input sample is given, a calculation amount may increase. However, the snapshot vector acquiring method described above with reference to FIGS. 11 and 12 may reduce a calculation amount by omitting a calculation with respect to a time interval in which summation time intervals overlap during a calculation process.

Referring again to FIG. 11, in operation S130, the UE 130 may calculate a covariance matrix based on the plurality of snapshot vectors. The covariance matrix may be represented as Equation 27.

$$R_{YY} = E[Y_A Y_A^H] = N^2 \cdot \text{diag}\begin{bmatrix} e^{i\varphi_1} \\ e^{i\varphi_2} \\ \vdots \\ e^{i\varphi_m} \end{bmatrix} A_a R_{hh} A_a^H \cdot \text{diag}\begin{bmatrix} e^{-i\varphi_1} \\ e^{-i\varphi_2} \\ \vdots \\ e^{-i\varphi_m} \end{bmatrix}$$ [Equation 27]

In Equation 27, $R_{YY}$ denotes a covariance matrix, $Y_A$ denotes a snapshot vector, and $E[Y_A Y_A^H]$ denotes an expectation value or an average value of $Y_A Y_A^H$ calculated from the plurality of snapshot vectors. The UE 130 may calculate a plurality of $Y_A Y_A^H$ based on the plurality of snapshot vectors. The UE 130 may calculate the covariance matrix by calculating expectation values or average value of the plurality of $Y_A Y_A^H$. In Equation 27, $A_a R_{hh} A_a^H$ denotes a square matrix. Therefore, if all of the initial phase values are identical and satisfy $\varphi_1 = \varphi_2 = \ldots \varphi_m$, Equation 27 may be simplified as represented by Equation 28.

[Equation 28]

$$\text{diag}\begin{bmatrix} e^{i\varphi_1} \\ e^{i\varphi_2} \\ \vdots \\ e^{i\varphi_m} \end{bmatrix}\begin{bmatrix} q_{11} & q_{12} & \cdots & q_{1m} \\ q_{21} & q_{22} & \cdots & q_{2m} \\ \vdots & \vdots & \ddots & \vdots \\ q_{m1} & q_{m1} & \cdots & q_{mm} \end{bmatrix} \cdot \text{diag}\begin{bmatrix} e^{-i\varphi_1} \\ e^{-i\varphi_2} \\ \vdots \\ e^{-i\varphi_m} \end{bmatrix} =$$

$$\begin{bmatrix} q_{11}e^{i(\varphi_1-\varphi_1)} & q_{12}e^{i(\varphi_1-\varphi_2)} & \cdots & q_{1m}e^{i(\varphi_1-\varphi_m)} \\ q_{21}e^{i(\varphi_2-\varphi_1)} & q_{22}e^{i(\varphi_2-\varphi_2)} & \cdots & q_{2m}e^{i(\varphi_2-\varphi_m)} \\ \vdots & \vdots & \ddots & \vdots \\ q_{m1}e^{i(\varphi_m-\varphi_1)} & q_{m1}e^{i(\varphi_m-\varphi_2)} & \cdots & q_{mm}e^{i(\varphi_m-\varphi_m)} \end{bmatrix} = \begin{bmatrix} q_{11} & q_{12} & \cdots & q_{1m} \\ q_{21} & q_{22} & \cdots & q_{2m} \\ \vdots & \vdots & \ddots & \vdots \\ q_{m1} & q_{m1} & \cdots & q_{mm} \end{bmatrix},$$

if $\varphi_1 = \varphi_2 = \ldots = \varphi_m$

That is, if $\varphi_1 = \varphi_2 = \ldots \varphi_m$, the UE 130 may simply calculate the covariance matrix $R_{YY}$ according to Equation 29 without awareness of information about an initial phase.

$$\therefore R_{YY} = E[Y_A Y_A^H] = N^2 \cdot A_a R_{hh} A_a^H$$ [Equation 29]

In operation S140, the UE 130 may estimate the reception delay time of the reference signal based on the covariance matrix. The UE 130 may estimate the reception delay time of the reference signal by applying a super-resolution analysis algorithm. Hereinafter, description is made based on an example in which the UE 130 estimates the reception delay time of the reference signal by applying a MUSIC algorithm. However, it is provided as an example only. For example, the UE 130 may use another super-resolution analysis algorithm, such as, ESPRIT algorithm, etc.

Figure 13:
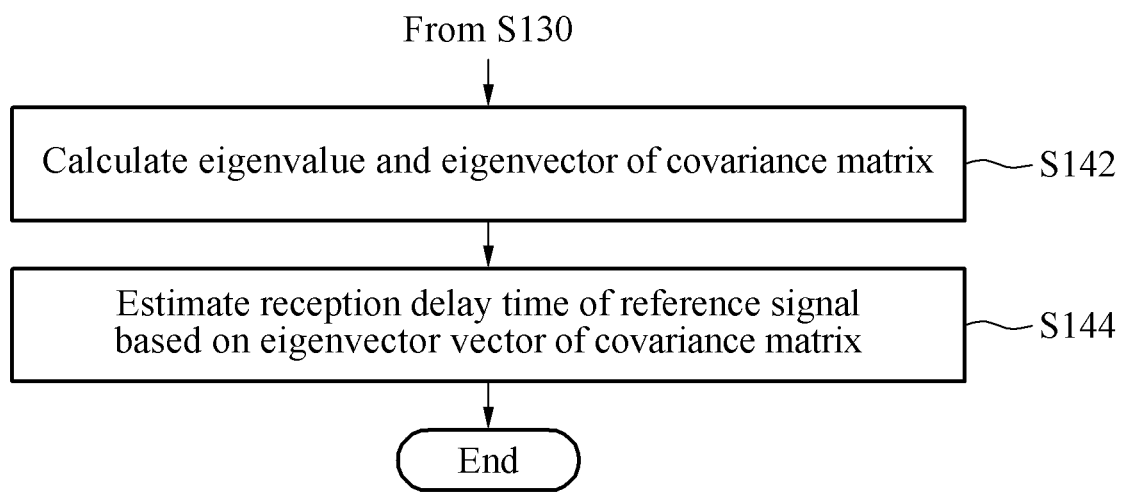
FIG. 13 is a flowchart illustrating an example of a process of performing operation S140 of FIG. 11.

FIG. 13 is a flowchart illustrating an example of a process of performing operation S140 of FIG. 11.

Referring to FIG. 13, in operation S142, the UE 130 may calculate an eigenvalue and an eigenvector of the covariance matrix. The UE 130 may calculate the eigenvalue and the eigenvector of the covariance matrix according to Equation 30.

$$R_{yy}q_i = \lambda_i q_i$$ [Equation 30]

In Equation 30, $q_i$ denotes an i-th eigenvector of a covariance matrix $R_{yy}$ and $\lambda_i$ denotes an i-th eigenvalue of the covariance matrix $R_{yy}$.

In operation S144, the UE 130 may estimate the reception delay time of the reference signal based on the eigenvector of the covariance matrix. For example, the UE 130 may apply a MUSIC algorithm according to Equation 31.

$$P_{music}(\tau_p) = \sum_i \frac{1}{|a^H(\tau_p)q_i|^2}$$ [Equation 31]

In Equation 31, $a(\tau_p)$ denotes a steering vector, which is described above with reference to Equation 25, and $q_i$ denotes an i-th eigenvector of the covariance matrix. Referring to Equation 31, the UE 130 may scan $\tau_p$ and may calculate $\tau_p$ that maximizes $P_{music}(\tau_p)$. The UE 130 may estimate $\tau_p$ that maximizes $P_{music}(\tau_p)$ as the reception delay time of the reference signal.

Hereinafter, a method of measuring a position of the UE 130 by applying the method of estimating a reception delay time of a reference signal is described.

Figure 14:
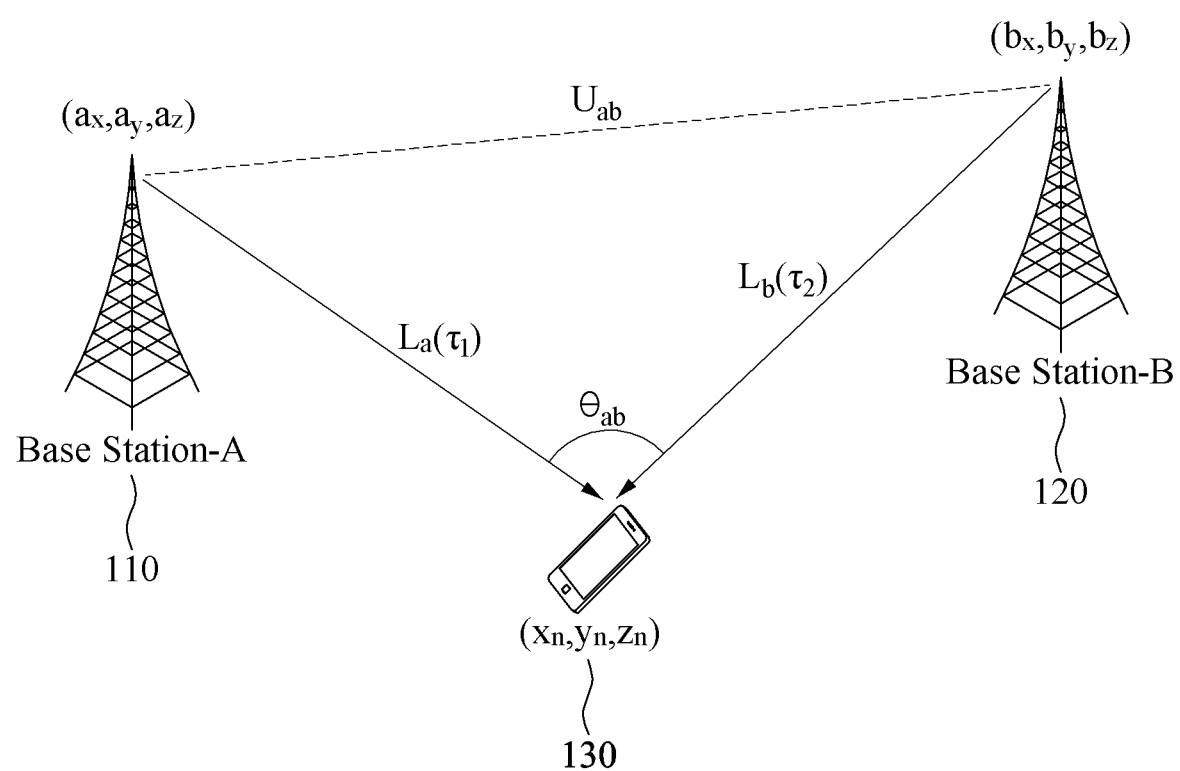
FIG. 14 illustrates an example of performing a positioning method according to at least one example embodiment.

FIG. 14 illustrates an example of performing a positioning method according to at least one example embodiment.

Referring to FIG. 14, the UE 130 may receive a first reference signal from a first base station (base station-A) 110 and the UE 130 may estimate a reception delay time of the reference signal. As another example, the UE 130 may measure a phase of arrival of a second reference signal. The UE 130 may receive the second reference signal from a second base station (base station-B) 120 and the UE 130 may estimate a reception delay time of the second reference signal. Although FIG. 14 illustrates two base stations as an example, it is provided as an example only. For example, the UE 130 may receive a reference signal from each of three or more base stations and may estimate a reception delay time of each of the reference signals.

Figure 15:
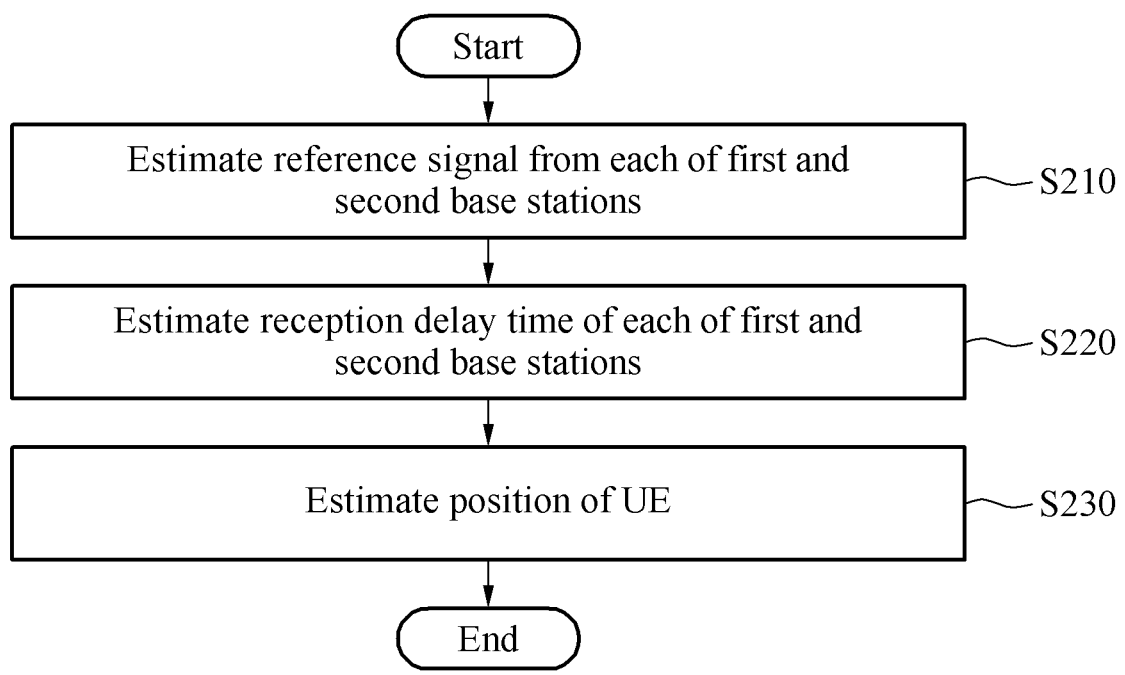
FIG. 15 is a flowchart illustrating an example of a positioning method of a UE according to at least one example embodiment.

FIG. 15 is a flowchart illustrating an example of a positioning method of the UE 130 according to at least one example embodiment.

Referring to FIG. 15, in operation S210, the UE 130 may receive a first reference signal from the first base station 110 and may receive a second reference signal from the second base station 120. However, it is provided as an example only. For example, the UE 130 may receive a reference signal from each of three or more base stations.

In operation S220, the UE 130 may estimate a reception delay time of the first reference signal and a reception delay time of the second reference signal. During this process, the UE 130 may employ the method of estimating a reception delay time of a reference signal, which is described above with reference to FIGS. 11 to 12. For example, a synchronization error between the first and second base stations 110 and 120 and the UE 130 is ε and a reception delay time of a reference signal between the first base station 110 and the UE 130 is $\tau_1$, the reception delay time of the first reference signal estimated by the UE 130 may be $\tau_1 - \epsilon$. If a reception delay time of a reference signal between the second base station 110 and the UE 130 is $\tau_2$, the reception delay time of the second reference signal estimated by the UE 130 may be $\tau_2 - \epsilon$. The UE 130 may calculate a difference between distance $L_b$ and distance $L_a$ based on a difference between an estimation value of the reception delay time of the first reference signal and an estimation value of the reception delay time of the second reference signal. For example, the UE 130 may calculate the difference between the distance $L_b$ and the distance $L_a$ according to Equation 32.

$$(\tau_2 - \epsilon) - (\tau_1 - \epsilon) = \tau_2 - \tau_1 = (L_b - L_a) \div c$$ [Equation 32]

In Equation 32, c denotes a light speed constant, $L_b$ denotes a distance between the second base station 120 and the UE 130, and $L_a$ denotes a distance between the first base station 110 and the UE 130. The UE 130 may randomly select two base stations and may calculate a distance difference value between the selected two base stations. The UE 130 may repeat a process of calculating a distance difference even with respect to third and fourth base stations. The UE 130 may estimate coordinates of a position of the UE 130 by applying a trilateration and the like based on the calculated distance difference values.

The method of estimating a reception delay time of a reference signal may apply to time synchronization between the first base station 110 and the second base station 120.

Figure 16:
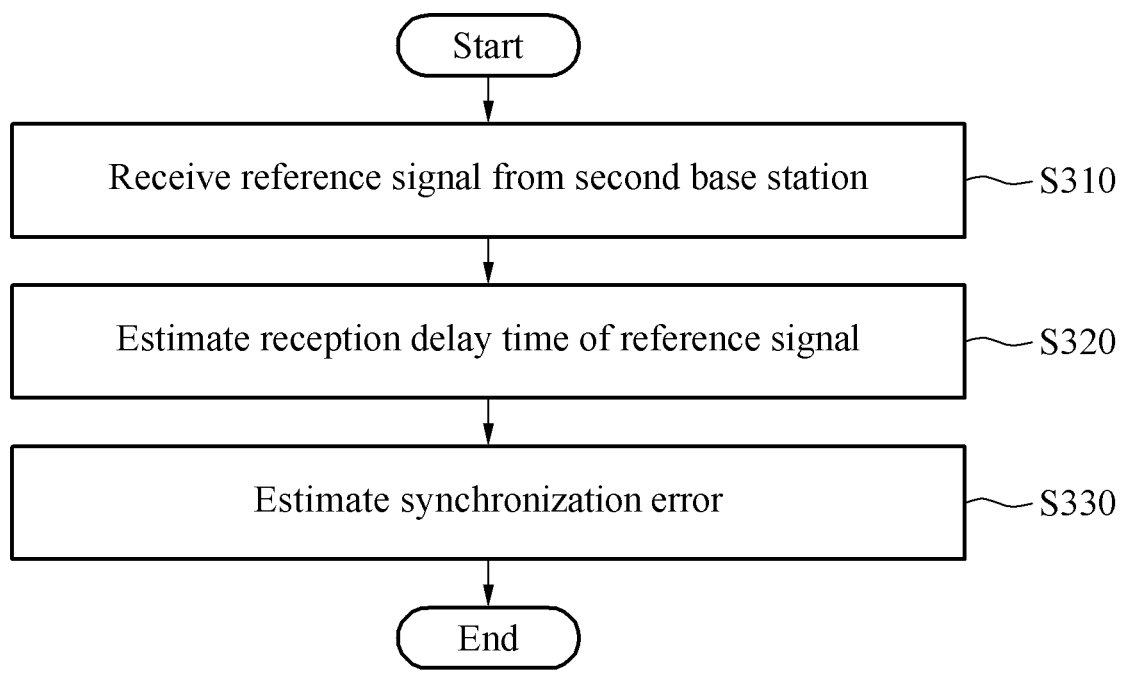
FIG. 16 is a flowchart illustrating an example of estimating, by a first base station, a synchronization error according to at least one example embodiment.

FIG. 16 is a flowchart illustrating an example of estimating, by the first base station 110, a synchronization error according to at least one example embodiment.

Referring to FIG. 16, in operation S310, the first base station 110 may receive a reference signal from the second base station 120. In operation S320, the first base station 110 may estimate a reception delay time of the reference signal. During this process, the first base station 110 may use the method of estimating a reception delay time of a reference signal, which is described above with reference to FIGS. 11 to 13.

In operation S330, the first base station 110 may estimate a synchronization error based on the estimated reception delay time of the reference signal. For example, if an actual multipath reference signal reception delay time between the first base station 110 and the second base station 120 is $[\tau_1, \tau_2, \tau_3, \ldots]$, the reference signal estimated by the first base station 110 may be $[\tau_1-\epsilon, \tau_2-\epsilon, \tau_3-\epsilon, \ldots]$. The first base station 110 may be already aware of a distance $U_{ab}$ between the first base station 110 and the second base station 120. Therefore, the first base station 110 may estimate the synchronization error $\epsilon$ by calculating $U_{ab}/c-(\tau_1-\epsilon)$.

Figure 17:
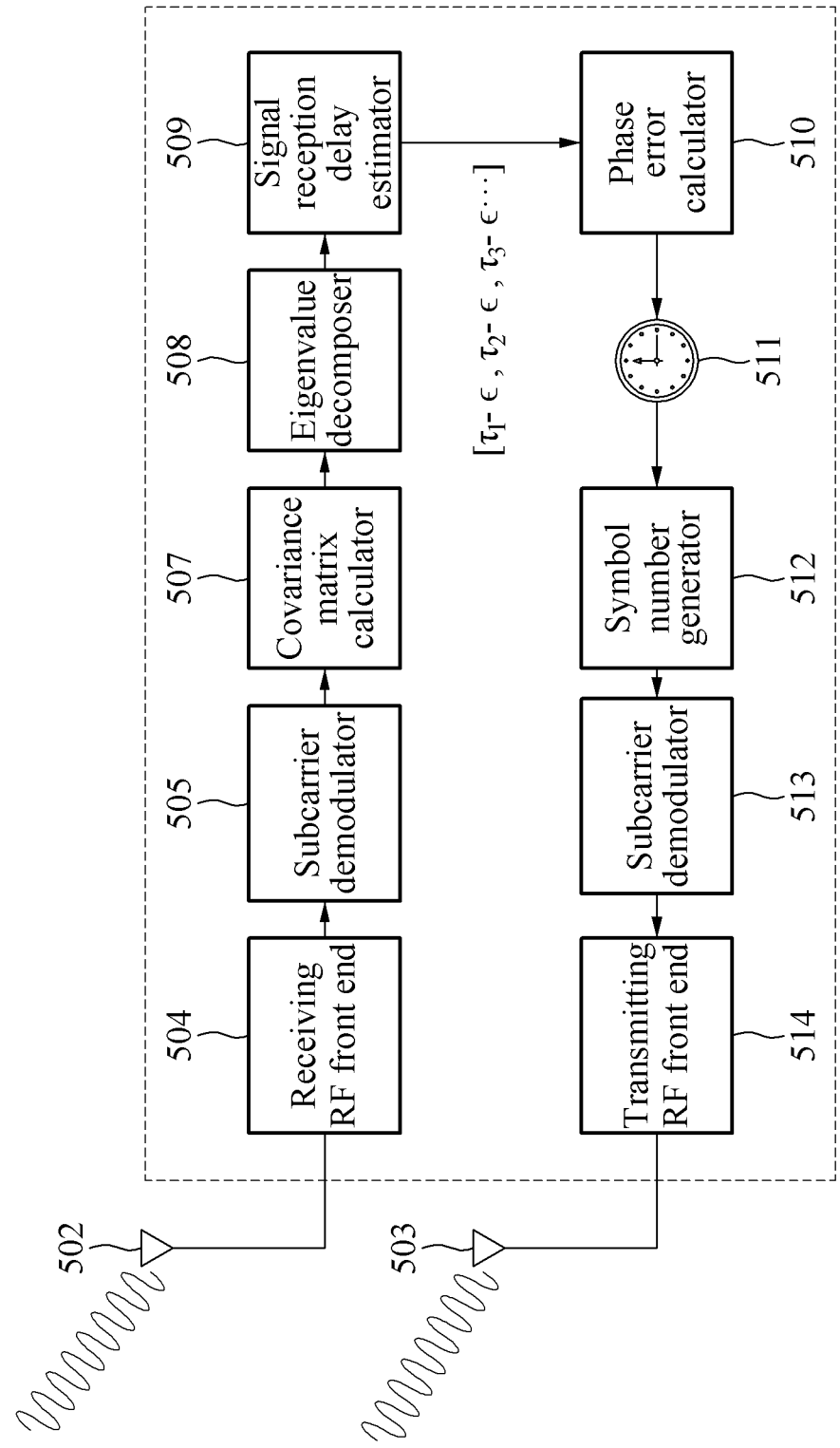
FIG. 17 is a block diagram illustrating an example of components of a first base station to perform synchronization according to at least one example embodiment.

FIG. 17 is a block diagram illustrating an example of components of the first base station 110 to perform synchronization according to at least one example embodiment. Although components of the receiver are classified based on a functional unit in FIG. 17, it is provided as an example only. The components are merely classified based on a corresponding function and may not be strictly classified in physical or logical terms.

Referring to FIG. 17, the first base station 110 may receive a reference signal transmitted from the second base station 120 via a receiving antenna 502. A receiving RF front end 504 may convert received reference signal data to baseband signal data. A subcarrier demodulator 505 may calculate a plurality of snapshot vectors. A covariance matrix calculator 507 may calculate a covariance matrix based on the plurality of snapshot vectors. An eigenvalue decomposer 508 may calculate an eigenvalue and an eigenvector of the covariance matrix. A signal reception delay estimator 509 may estimate a reception delay time of the reference signal based on the eigenvector. A phase error calculator 510 may calculate a phase error of a local oscillator 511 based on the estimated reception delay time of the reference signal. The local oscillator 511 may control a symbol number generator 512 to remove a synchronization error based on the calculated phase error. The symbol number generator 512 may increase a symbol number at a modified point in time under control of the local oscillator 511. A subcarrier modulator 513 may generate the reference signal based on the modified point in time at which the symbol number increases. A transmitting RF front end 514 may modulate the generated reference signal to a passband signal. A transmitting antenna 503 may transmit the passband signal.

A method of estimating a reception delay time of a reference signal and a positioning method and a synchronization method using the same are described above with reference to FIGS. 1 to 17. According to at least one example embodiment, since a waveform of each of subcarrier signals of a reference signal is continuous in a boundary between symbols, a receiver may readily acquire a relatively large number of snapshot vectors. Also, according to at least one example embodiment, since a Vandermonde matrix is used during a process of calculating a snapshot vector and a covariance matrix, a calculation process may be simplified. Also, according to at least one example embodiment, a calculation amount used for a receiver to calculate a plurality of snapshot vectors may decrease.

One of ordinary skill in the art may easily understand that the methods and/or processes and operations described herein may be implemented using hardware components, software components, and/or a combination thereof based on the example embodiments. For example, the hardware components may include a general-purpose computer and/or exclusive computing device or a specific computing device or a special feature or component of the specific computing device. The processes may be implemented using one or more processes having an internal and/or external memory, for example, a microprocessor, a controller such as a microcontroller and an embedded microcontroller, a microcomputer, an arithmetic logic unit (ALU), and a digital signal processor such as a programmable digital signal processor or other programmable devices. In addition, as an alternative, the processes may be implemented using an application specific integrated circuit (ASIC), a programmable gate array, such as, for example, a field programmable gate array (FPGA), a programmable logic unit (PLU), or a programmable array logic (PAL), and other devices capable of executing and responding to instructions in a defined manner, other devices configured to process electronic devices, and combinations thereof. The processing device may run an operating system (OS) and one or more software applications that run on the OS. Also, the processing device may access, store, manipulate, and create data in response to execution of the software. For purpose of simplicity, the description of a processing device is used as a singular; however, one skilled in the art will appreciate that a processing device may include a plurality of processing elements and/or multiple types of processing elements. For example, the processing device may include a plurality of processor or a single processor and a single controller. In addition, different processing configurations are possible such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable recording media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable recording media include magnetic media such as hard disks, floppy disks, and magnetic tape; optical media such as CD ROM, DVD, and blue-rays; magneto-optical media such as floptical disks; and hardware devices that are specially to store and perform program instructions, such as read-only memory (ROM), random access memory (RAM), flash memory, and the like. Examples of program instructions include both machine code, such as produced by a compiler and files containing structural programming languages such as C++ object-oriented programming language and high or low programming languages (assembly languages, hardware technical languages, database programming languages and techniques) to run on one of the aforementioned devices and a processor, a processor architecture, or a heterogeneous combination of combinations of different hardware and software components, or a machine capable of executing program instructions. Accordingly, they may include a machine language code, a byte code, and a high language code executable using an interpreter and the like.

Therefore, according to an aspect of at least one example embodiment, the aforementioned methods and combinations thereof may be implemented by one or more computing devices as an executable code that performs the respective operations. According to another aspect, the methods may be implemented by systems that perform the operations and may be distributed over a plurality of devices in various manners or all of the functions may be integrated into a single exclusive, stand-alone device, or different hardware. According to another aspect, devices that perform operations associated with the aforementioned processes may include the aforementioned hardware and/or software. According to another aspect, all of the sequences and combinations associated with the processes are to be included in the scope of the present disclosure.

For example, the described hardware devices may be to act as one or more software modules in order to perform the operations of the above-described example embodiments, or vice versa. The hardware devices may include a processor, such as, for example, an MPU, a CPU, a GPU, a TPU, etc., configured to be combined with a memory such as ROM/RAM configured to store program instructions and to execute the instructions stored in the memory, and may include a communicator capable of transmitting and receiving a signal with an external device. In addition, the hardware devices may include a keyboard, a mouse, and an external input device for receiving instructions created by developers.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Accordingly, the present disclosure is not limited to the aforementioned example embodiments and may belong to the scope of example embodiments disclosed herein and equally or equivalently modified from the claims. For examples, although the methods may be implemented in different sequence and/or components of systems, structures, apparatuses, circuits, etc., may be combined or integrated in different form or may be replaced with other components or equivalents, appropriate results may be achieved.

Such equally or equivalently modified example embodiments may include logically equivalent methods capable of achieving the same results according to the example embodiments. Accordingly, the present disclosure and the scope thereof are not limited to the aforementioned example embodiments and should be understood as a widest meaning allowable by law.

What is claimed is:

1. A method of estimating, by a user equipment, a reception delay time of a reference signal, the method comprising:
   receiving a reference signal from a base station;
   setting a plurality of summation time intervals within a time interval in which the reference signal is received, and acquiring a plurality of snapshot vectors corresponding to the plurality of summation time intervals;
   calculating a covariance matrix based on the plurality of snapshot vectors; and
   estimating a reception delay time of the reference signal based on the covariance matrix; wherein the plurality of summation time intervals is set by shifting a start point of a summation time interval within the time interval in which the reference signal is received by an integer multiple of a sample time that is determined based on a sampling rate.

2. The method of claim 1, wherein the reference signal includes a plurality of subcarrier signals, and
   a waveform of each of the plurality of subcarrier signals is continuous in a plurality of symbol periods.

3. The method of claim 1, wherein an n-th snapshot vector corresponding to an n-th summation time interval is calculated and an (n+1)-th snapshot vector corresponding to an (n+1)-th summation time interval is calculated, and
   a portion of a calculation result of the n-th snapshot vector is applied to a part corresponding to a time interval in which the n-th summation time interval and the (n+1)-th summation time interval overlap during a process of calculating the (n+1)-th snapshot vector.

4. The method of claim 1, wherein the reference signal includes a plurality of subcarrier signals, and
   the plurality of subcarrier signals is provided at identical intervals in a frequency domain.

5. The method of claim 4, wherein the snapshot vector is represented as a multiplication of a plurality of matrices, and
   a condition that at least one of the plurality of matrices is a Vandermonde matrix is satisfied.

6. The method of claim 1, wherein an eigenvector of the covariance matrix is calculated and the reception delay time of the reference signal is estimated based on the eigenvector of the covariance matrix.

7. The method of claim 1, wherein the calculating of the covariance matrix comprises extracting a time independent component and a time dependent error component of each of the plurality of snapshot vectors, offsetting the time dependent error component of each of the plurality of snapshot vectors, and calculating the covariance matrix based on the time independent component of each of the plurality of snapshot vectors.

8. A user equipment comprising:
a communication interface device configured to communicate with another apparatus;
a processor; and
a memory configured to store at least one instruction executed through the processor,
wherein the processor is configured to receive a reference signal from a base station, to set a plurality of summation time intervals within a time interval in which the reference signal is receive, and acquire a plurality of snapshot vectors corresponding to the plurality of summation time intervals, to calculate a covariance matrix based on the plurality of snapshot vectors, and to estimate a reception delay time of the reference signal based on the covariance matrix; wherein the plurality of summation time intervals by shifting a start point of a summation time interval within the time interval in which the reference signal is received by an integer multiple of a sample time that is determined based on a sampling rate.

9. The user equipment of claim 8, wherein the reference signal includes a plurality of subcarrier signals, and
a waveform of each of the plurality of subcarrier signals is continuous in a plurality of symbol periods.

10. The user equipment of claim 9, wherein the at least one instruction is executed to calculate an n-th snapshot vector corresponding to an n-th summation time interval and calculate an (n+1)-th snapshot vector corresponding to an (n+1)-th summation time interval, and to apply a portion of a calculation result of the n-th snapshot vector to a part corresponding to a time interval in which the n-th summation time interval and the (n+1)-th summation time interval overlap during a process of calculating the (n+1)-th snapshot vector.

11. The user equipment of claim 8, wherein the reference signal includes a plurality of subcarrier signals,
the plurality of subcarrier signals is provided at identical intervals in a frequency domain,
the snapshot vector is represented as a multiplication of a plurality of matrices, and
a condition that at least one of the plurality of matrices is a Vandermonde matrix is satisfied.

12. The user equipment of claim 8, wherein the at least one instruction is executed to calculate an eigenvector of the covariance matrix and to estimate the reception delay time of the reference signal based on the eigenvector of the covariance matrix.

13. A method of estimating, by a first base station, a reception delay time of a reference signal, the method comprising:
receiving a reference signal from a second base station;
setting a plurality of summation time intervals within a time interval in which the reference signal is received, and acquiring a plurality of snapshot vectors corresponding to the plurality of summation time intervals;
calculating a covariance matrix based on the plurality of snapshot vectors; and
estimating a reception delay time of the reference signal based on the covariance matrix; wherein the plurality of summation time intervals is set by shifting a start point of a summation time interval within the time interval in which the reference signal is received by an integer multiple of a sample time that is determined based on a sampling rate.

14. The method of claim 13, wherein the reference signal includes a plurality of subcarrier signals,
a waveform of each of the plurality of subcarrier signals is continuous in a plurality of symbol periods.

15. The method of claim 14, wherein an n-th snapshot vector corresponding to an n-th summation time interval is calculated and an (n+1)-th snapshot vector corresponding to an (n+1)-th summation time interval is calculated, and
a portion of a calculation result of the n-th snapshot vector is applied to a part corresponding to a time interval in which the n-th summation time interval and the (n+1)-th summation time interval overlap during a process of calculating the (n+1)-th snapshot vector.

16. The method of claim 13, wherein the reference signal includes a plurality of sub carrier signals,
the plurality of subcarrier signals is provided at identical intervals in a frequency domain,
the snapshot vector is represented as a multiplication of a plurality of matrices, and
a condition that at least one of the plurality of matrices is a Vandermonde matrix is satisfied.

17. The method of claim 13, wherein an eigenvector of the covariance matrix is calculated and the reception delay time of the reference signal is estimated based on the eigenvector of the covariance matrix.

18. The method of claim 13, further comprising:
estimating an offset between a timer of the first base station and a timer of the second base station based on the reception delay time of the reference signal and distance information between the first base station and the second base station.

* * * * *